(12) United States Patent
Sakurai et al.

(10) Patent No.: US 8,855,721 B2
(45) Date of Patent: Oct. 7, 2014

(54) WIRELESS COMMUNICATION DEVICE, IMPEDANCE ADJUSTMENT METHOD, CASING POSITION DETECTION METHOD AND INFORMATION DISPLAY METHOD

(75) Inventors: Masanori Sakurai, Tokyo (JP); Naoki Kobayashi, Tokyo (JP); Noriaki Ando, Tokyo (JP); Hiroshi Toyao, Tokyo (JP); Masaharu Imazato, Tokyo (JP)

(73) Assignee: NEC Corporation, Tokyo (JP)

( * ) Notice: Subject to any disclaimer, the term of this patent is extended or adjusted under 35 U.S.C. 154(b) by 9 days.

(21) Appl. No.: 13/577,015

(22) PCT Filed: Mar. 25, 2011

(86) PCT No.: PCT/JP2011/001761
§ 371 (c)(1),
(2), (4) Date: Aug. 3, 2012

(87) PCT Pub. No.: WO2011/121957
PCT Pub. Date: Oct. 6, 2011

(65) Prior Publication Data
US 2012/0295666 A1 Nov. 22, 2012

(30) Foreign Application Priority Data

Mar. 31, 2010 (JP) .................................. 2010-081484
Mar. 31, 2010 (JP) .................................. 2010-081502

(51) Int. Cl.
| | |
|---|---|
| H04B 1/38 | (2006.01) |
| H04M 1/02 | (2006.01) |
| H01Q 1/24 | (2006.01) |
| H04M 1/00 | (2006.01) |
| H01F 27/42 | (2006.01) |

(52) U.S. Cl.
CPC ............ *H04M 1/0227* (2013.01); *H01Q 1/243* (2013.01); *H04M 2250/12* (2013.01)
USPC .......................... 455/566; 307/104; 455/575.4

(58) Field of Classification Search
CPC ............ H04M 1/0237; H04M 1/0247; H04M 1/0227; H04M 1/0235; H04M 1/0266; H04M 1/022; H04M 1/0231; H04M 1/0233; H04M 1/0239; H04M 1/0241; H04M 1/0243; G06F 1/1616; G06F 1/1677; G06F 1/1681
USPC .................................. 455/566, 575.4; 307/104
See application file for complete search history.

(56) References Cited

U.S. PATENT DOCUMENTS 5,786,979 A * 7/1998 Douglass ..................... 361/328
2006/0286842 A1 * 12/2006 Kuwajima et al. ............ 439/260
(Continued)

FOREIGN PATENT DOCUMENTS

| CN | 1884860 A | 12/2006 |
|---|---|---|
| CN | 101010929 A | 8/2007 |

(Continued)

OTHER PUBLICATIONS

The international search report for PCT/JP2011/001761, dated Jun. 21, 2011.
(Continued)

*Primary Examiner* — Timothy Pham
(74) *Attorney, Agent, or Firm* — Sughrue Mion, PLLC

(57) ABSTRACT

A wireless communication device (100) includes a first casing (10) and a second casing (20), and is switched between at least a first state and a second state by displacement of the first casing (10) and the second casing (20). The first casing (10) includes a first conductor (15) and a conductor element (36a) connected thereto. The second casing (20) includes a second conductor (25), and is connected to the first casing (10) so as to be rotationally displaceable with respect to each other around a perpendicular axis. In a first state, an opposite region (241) in the second conductor (25) and the conductor element (36a) are located at positions opposite to each other, and the conductor element (36a) and the second conductor (25) allow electrical conduction to each other at a predetermined frequency. In a second state, the electrical conduction state is different from that in the first state.

28 Claims, 12 Drawing Sheets

(56) References Cited

U.S. PATENT DOCUMENTS

| | | | |
|---|---|---|---|
| 2007/0159401 A1* | 7/2007 | Baliarda et al. | 343/702 |
| 2008/0048925 A1* | 2/2008 | Soutome et al. | 343/846 |
| 2008/0300028 A1 | 12/2008 | Uejima et al. | |
| 2009/0224982 A1* | 9/2009 | Isoda et al. | 343/702 |
| 2011/0032667 A1 | 2/2011 | Kobayashi et al. | |
| 2013/0147333 A1* | 6/2013 | Takagi et al. | 312/319.2 |

FOREIGN PATENT DOCUMENTS

| | | |
|---|---|---|
| JP | 2001156893 A | 6/2001 |
| JP | 2006054843 A | 2/2006 |
| JP | 2006067361 A | 3/2006 |
| JP | 2006197292 A | 7/2006 |
| JP | 2006352729 A | 12/2006 |
| JP | 2007228413 A | 9/2007 |
| JP | 2008211447 A | 9/2008 |
| JP | 2009268050 A | 11/2009 |
| JP | 4413145 B2 | 2/2010 |

OTHER PUBLICATIONS

Chinese Office Action for CN Application No. 201180018091.6 issued on Jan. 13, 2014 with English Translation.

* cited by examiner

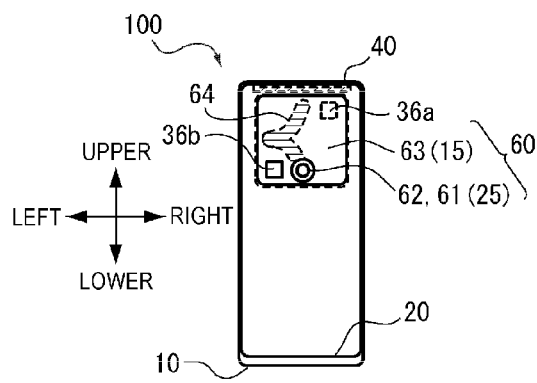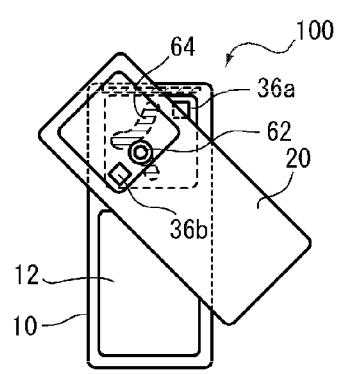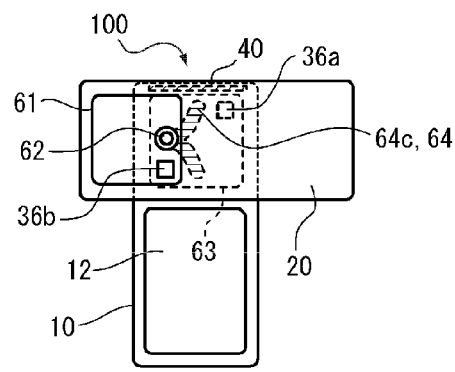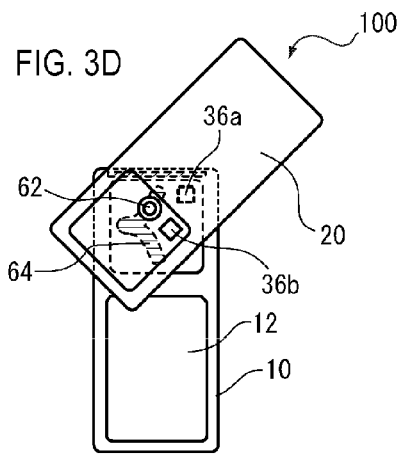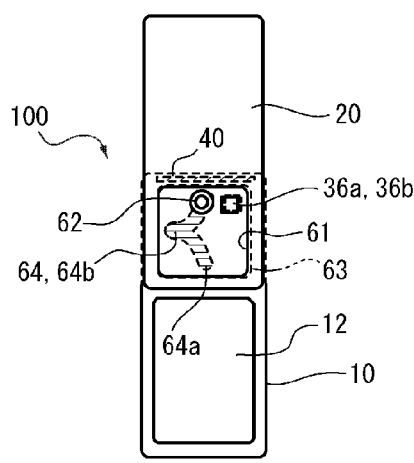

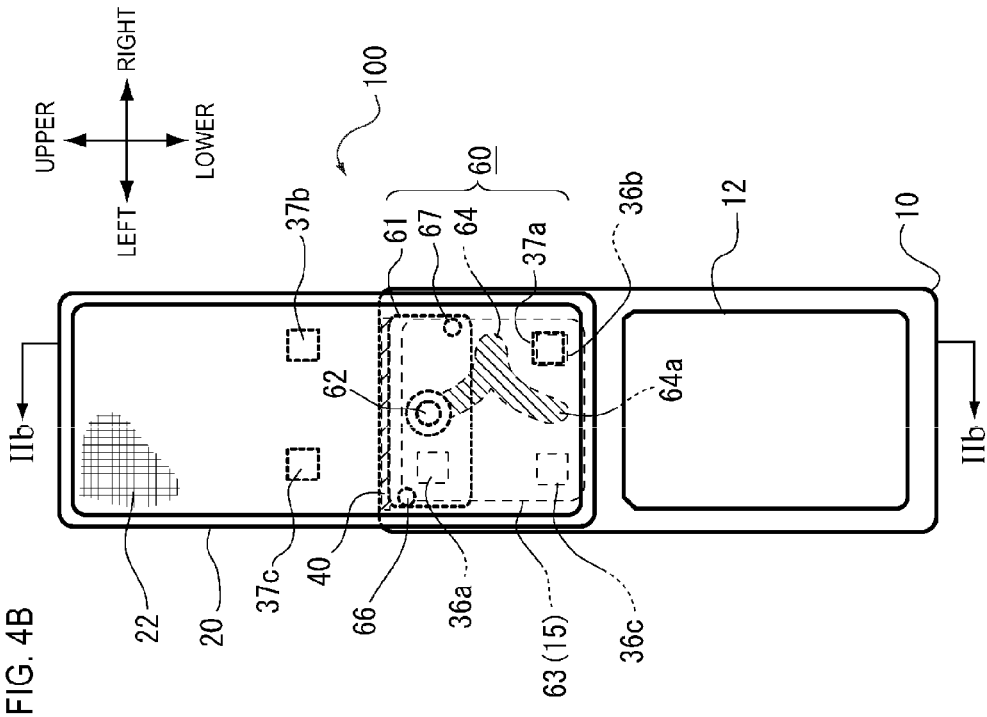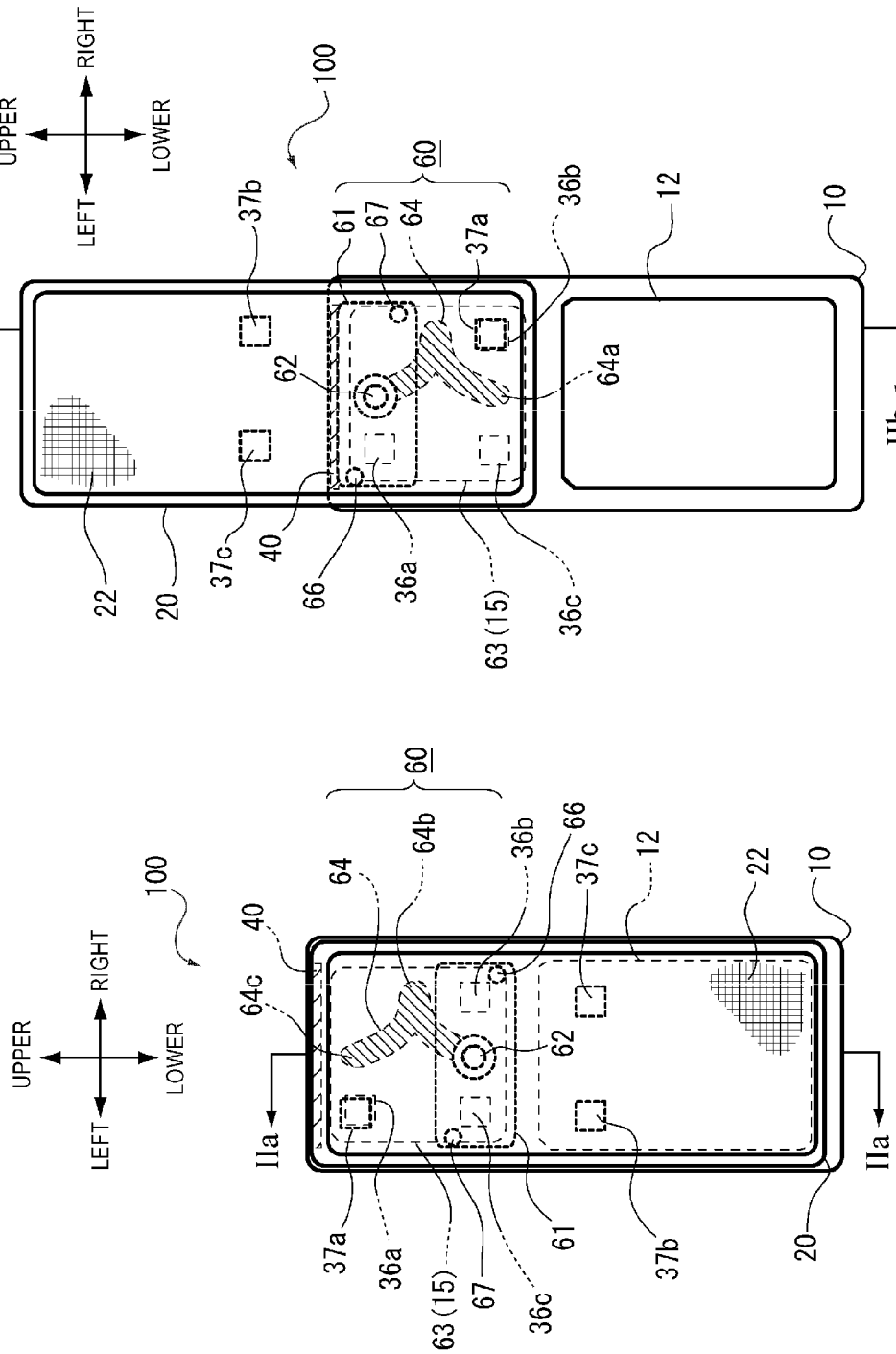

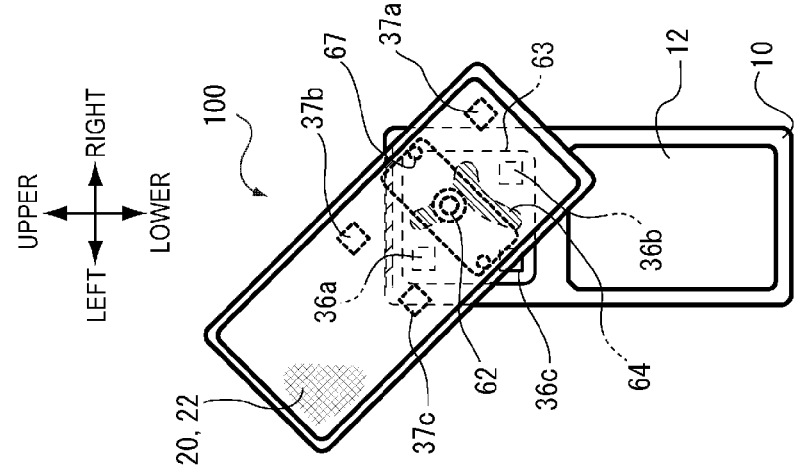
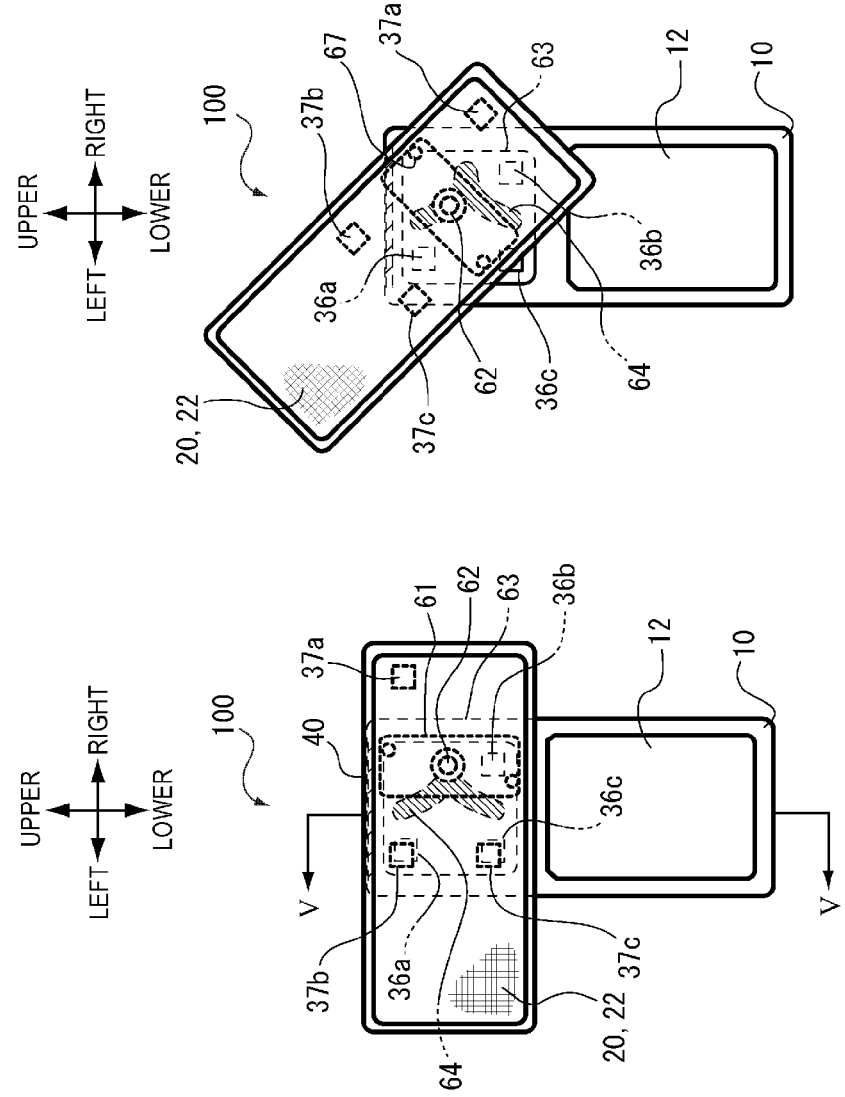
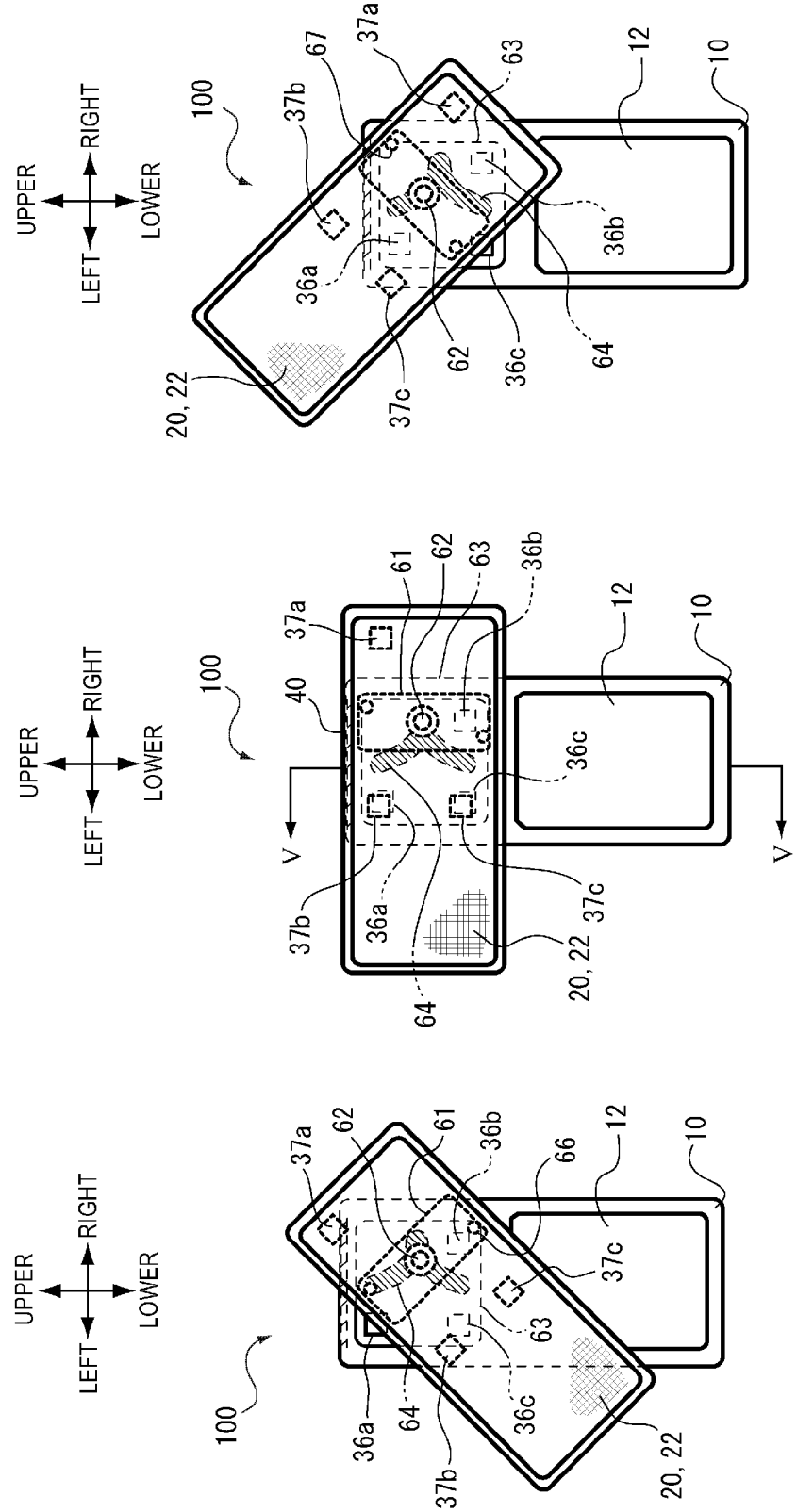

WIRELESS COMMUNICATION DEVICE, IMPEDANCE ADJUSTMENT METHOD, CASING POSITION DETECTION METHOD AND INFORMATION DISPLAY METHOD

TECHNICAL FIELD

The present invention relates to a wireless communication device, an impedance adjustment method, a casing position detection method and an information display method.

BACKGROUND ART

In recent years, cellular phones (wireless communication devices) in which a plurality of casings coupled to each other are diversely displaced have been proposed. Particularly, there have been proposed cellular phones of a type in which casings are caused to intersect each other in a T-shape by horizontal rotation around a perpendicular axis in a state where the perpendicular directions of two casings are substantially in coincident with each other.

Patent Document 1 discloses a cellular phone capable of displacing two casings among three stable states by providing a hinge mechanism for rotating and sliding a mounting shaft with respect to a forked groove portion. Specifically, the intersection angle of long-side directions of two casings can be displaced 0 degrees (closed state), 90 degrees (T-shaped intersection state) or 180 degrees (open state).

In the technique, from a viewpoint of securing the strength of the hinge mechanism, an improvement in abrasion resistance thereof, and the like, a base plate having a groove portion and a movable plate which slides with respect to the base plate together with the mounting shaft are formed of a metal member. The base plate is fixed to one casing and the movable plate is fixed to the other casing, so that the two casings are displaced to a closed state, an intersection state or an open state.

In addition, Patent Document 2 discloses a wireless communication device in which a folding type using the short-side directions of two casings as a rotational axis and a horizontal rotary type are combined. In the device, switching is performed between a fold-in-two closed state and a longitudinal open state by a folding operation. Further, the casings are changed to a T-shaped intersection state by performing a horizontal rotation in an open state.

On the other hand, the casings generally include various types of conductors such as a metal member of the hinge mechanism as mentioned above, a metal plate (insert sheet metal) buried in a resin material through insert molding, or a conductor layer in various types of circuit substrates. Particularly, an insert sheet metal is often provided in the vicinity of the hinge mechanism, from a viewpoint of securing of rigidity or strength.

RELATED DOCUMENTS

Patent Documents

[Patent Document 1] Japanese Unexamined Patent Publication No. 2009-268050
[Patent Document 2] Japanese Unexamined Patent Publication No. 2008-211447

DISCLOSURE OF THE INVENTION

However, when a plurality of casings including conductors are relatively displaced, there may be a problem that the impedance of the wireless communication device fluctuates due to a change in the positional relationship between conductors. Specifically, for example, there may be a case in which the impedance of the hinge mechanism fluctuates due to a change in the positional relationship between the base plate and the movable plate of the hinge mechanism, and thus the hinge mechanism in any of the displacement positions resonates at a communication frequency of the wireless communication device. In addition, there may be a case in which the relative positions are changed similarly between the hinge mechanism and the insert sheet metal, or between the insert sheet metals of each casing, and thus the resonance frequency and the communication frequency are close to each other.

As stated above, when the conductor included in the wireless communication device resonates at the communication frequency, an adverse effect may occur in the communication quality due to a change in the antenna characteristics of an antenna element.

The invention is contrived in view of such circumstances, and an object thereof is to provide a technique capable of reducing an adverse effect on the antenna characteristics of an antenna element when a plurality of casings rotationally displaced with each other around a perpendicular axis are relatively displaced.

According to the invention, there is provided a wireless communication device including: a first casing including a first conductor and a conductor element connected to the first conductor; a second casing including a second conductor; and a coupling mechanism that couples the first casing and the second casing so as to be rotationally displaceable with respect to each other around a perpendicular axis, wherein the first casing and the second casing are rotationally displaced with respect to each other, so that at least a predetermined region in the second conductor and the conductor element are located at positions opposite to each other, and switching is performed between a first state where the conductor element and the second conductor allow electrical conduction to each other at a predetermined frequency and a second state of which the electrical conduction state is different from the first state.

According to the invention, there is provided an impedance adjustment method of reducing impedance of a wireless communication device which includes a first casing including a first conductor and a conductor element connected to the first conductor, a second casing including a second conductor, and a coupling mechanism that couples the first casing and the second casing so as to be rotationally displaceable with respect to each other around a perpendicular axis, including: wherein the first casing and the second casing are rotationally displaced to transition between an open state and a closed state, and in the open state or the closed state, the conductor element which is opposite to the second conductor at a predetermined interval is caused to resonate at a communication frequency of the wireless communication device, to thereby reduce the impedance of the wireless communication device at the communication frequency.

Meanwhile, various types of components of the invention do not necessarily have to exist individually independently, and may be configured such that a plurality of components are formed as one member, one component is formed by a plurality of members, any component is a portion of other components, and a portion of any component and a portion of other components duplicate each other.

According to the wireless communication device and the impedance adjustment method of the invention, it is possible to reduce an adverse effect on the antenna characteristics of an antenna element when a plurality of casings are relatively displaced.

BRIEF DESCRIPTION OF THE DRAWINGS

The above-mentioned objects, other objects, features and advantages will be made clearer from the preferred embodiments described below, and the following accompanying drawings.

FIG. 3A is a schematic plan view illustrating a closed state of a wireless communication device according to a second embodiment. FIG. 3B is a schematic plan view illustrating a state in which a second casing in the closed state is rotated about 45 degrees counterclockwise with respect to a first casing. FIG. 3C is a schematic plan view illustrating an intersection state of the wireless communication device. FIG. 3D is a schematic plan view illustrating a state in which the second casing in the intersection state is further rotated about 45 degrees counterclockwise with respect to the first casing. FIG. 3E is a schematic plan view illustrating an open state of the wireless communication device.

FIG. 4A is a schematic plan view illustrating a closed state of a wireless communication device according to a third embodiment. FIG. 4B is a schematic plan view illustrating an open state of the wireless communication device.

FIG. 7A is a schematic plan view illustrating a first transition state of a wireless communication device according to a fourth embodiment. FIG. 7B is a schematic plan view illustrating an intersection state of the wireless communication device. FIG. 7C is a schematic plan view illustrating a second transition state of the wireless communication device.

DESCRIPTION OF EMBODIMENTS

Figure 1A:
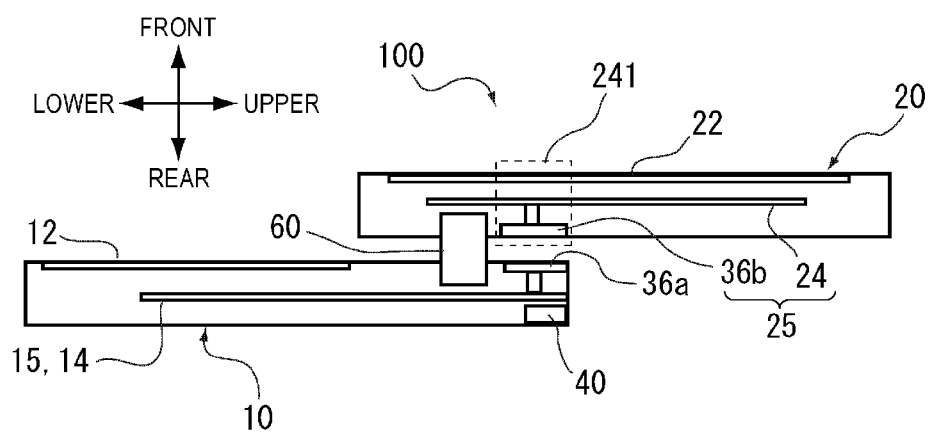
FIG. 1A is a schematic diagram illustrating a first state of a wireless communication device according to a first embodiment.

Hereinafter, the embodiments of the invention will be described with reference to the accompanying drawings. In all the drawings, like elements are referenced by like reference numerals and signs and descriptions thereof will not be repeated.

<First Embodiment>

Figure 1B:
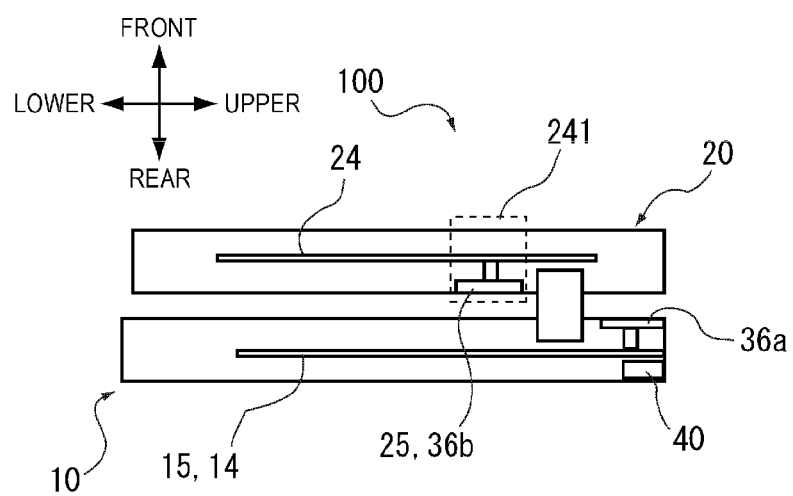
FIG. 1B is a schematic diagram illustrating a second state of the wireless communication device.

FIGS. 1A and 1B are schematic vertical cross-sectional views in which a wireless communication device 100 according to the embodiment is cut in the depthwise direction. FIG. 1A is a schematic diagram illustrating a first state of the wireless communication device 100, and FIG. 1B is a schematic diagram illustrating a second state of the wireless communication device 100.

To begin with, an outline of the wireless communication device 100 according to the embodiment will be described.

The wireless communication device 100 includes a first casing 10, a second casing 20, and a coupling mechanism 60 that couples the first casing 10 and the second casing 20 so as to be rotationally displaceable with respect to each other around a perpendicular axis. The first casing 10 and the second casing 20 are rotationally displaced with respect to each other, so that switching is performed between at least the following first state and second state.

The first casing 10 includes a first conductor 15 (first circuit substrate 14) and a conductor element 36a connected to the first conductor 15 (first circuit substrate 14). The second casing 20 includes a second conductor 25.

In the first state (see FIG. 1A), a predetermined region (opposite region 241) in the second conductor 25 and a conductor element 36a are located at positions opposite to each other, the conductor element 36a and the second conductor 25 allow electrical conduction to each other at a predetermined frequency. The second state (see FIG. 1B) is a state in which the electrical conduction state is different from the first state.

In the embodiment, in the second state (see FIG. 1B), the predetermined region (opposite region 241) and the conductor element 36a are located at positions which are not opposite to each other.

Next, the wireless communication device 100 according to the embodiment will be described in detail. As shown in FIGS. 1A and 1B, in the embodiment, the vertical direction of paper equivalent to the perpendicular direction of an operation key 12 of the first casing 10 is specified as a front-back direction, and the horizontal direction of paper equivalent to the long-side direction of the wireless communication device 100 is specified as a vertical direction. However, these are directions specified for convenience in order to describe the relative relationship between components, and do not limit directions at the time of manufacturing or using the wireless communication device 100.

The wireless communication device 100 is, for example, a cellular phone.

The first casing 10 according to the embodiment is a casing on the operation side for a user to perform a key operation by grasping with the hands, and is provided with the operation key 12, the first circuit substrate 14 and a power source (not shown). The operation key 12 is an input interface for a user to perform an input operation with fingers or the like.

The first casing 10 is provided with an antenna element 40 that transmits and receives radio waves having a predetermined communication frequency. However, the antenna element 40 may be provided to the second casing 20, may be provided to the coupling mechanism (hinge mechanism) 60, or may be provided across them.

The second casing 20 according to the embodiment is a casing on the display side including a display panel 22 and a second circuit substrate 24. The display panel 22 is a display for performing various display outputs. The second circuit substrate 24 receives a signal from a first circuit substrate 14 through an interconnect (not shown) inserted into the coupling mechanism 60 and controls the display panel 22. A second conductor element 36b described later is connected to the second circuit substrate 24. The second conductor 25 included in the second casing 20 is constituted by the second circuit substrate 24 and the second conductor element 36b.

Meanwhile, in the embodiment, the casing provided with the conductor element 36a is called the first casing 10. Therefore, when the conductor element 36a is provided to the casing on the display side, the casing on the display side is equivalent to the first casing 10. In addition, the wireless communication device 100 is constituted by the first casing 10 and the second casing 20, and the coupling mechanism 60 that couples the first casing 10 to the second casing 20 or configuration members other than the antenna are included in either the first casing 10 or the second casing 20.

Signals having various operating frequencies of the wireless communication device 100 are transmitted between the first circuit substrate 14 and the second circuit substrate 24. The wireless communication device 100 may have a plurality of operating frequencies. The operating frequency includes a clock frequency of an element mounted to the first circuit substrate 14 or the second circuit substrate 24, or a communication frequency of the antenna element 40, by way of example.

The communication frequency of the antenna element 40 includes a frequency band of a positioning system or a digital television, in addition to a call or communication frequency band of a cellular phone or a wireless communication system. Specifically, the communication frequency includes a 2.4 GHz band, a 5 GHz band or the like for the wireless local area network (LAN), in addition to a 800 MHz band, a 1.5 GHz band and a 2 GHz band for the mobile communication system.

The coupling mechanism 60 is constituted by a member that couples the first casing 10 and the second casing 20 so as to be rotationally displaceable with respect to each other. The coupling mechanism 60 of the embodiment includes a horizontal rotation type hinge that couples the first casing 10 and the second casing 20 so as to be rotatable with each other around a perpendicular axis, by way of example. The term "perpendicular axis" herein means a normal direction of either the first casing 10 or the second casing 20. The wireless communication device 100 of the embodiment includes a case where the first casing 10 and the second casing 20 are parallel to each other and the perpendicular axes are in coincident with each other, by way of example. The hinge herein is not limited to performing a hinged opening/closing operation, and includes a slide type for relatively sliding the first casing 10 and the second casing 20. The coupling mechanism 60 may be a mechanism formed of one material in a concavo-convex shape which is capable of fitting the first casing 10 and the second casing 20 to each other, or may be a mechanism in which a hinge mechanism created as a different form from the casing is assembled into the casing.

Hereinafter, a method of reducing impedance (hereinafter, sometimes called the present method) achieved by the wireless communication device 100 of the embodiment will be described.

The present method relates to a method of reducing impedance of the wireless communication device 100 which includes the first casing 10 including the first conductor 15 (first circuit substrate 14) and the conductor element 36a connected to the first conductor 15, the second casing 20 including the second conductor 25 (second circuit substrate 24 and second conductor element 36b), and the coupling mechanism 60 that couples the first casing 10 and the second casing 20 so as to be rotationally displaceable with respect to each other around a perpendicular axis. The present method is characterized in that the first casing 10 and the second casing 20 are rotationally displaced to transition between the open state and the closed state, and in the open state or the closed state, the conductor element 36a which is opposite to the second conductor 25 at a predetermined interval without interposing another conductor is caused to resonate at a communication frequency of the wireless communication device 100, to thereby reduce the impedance of the wireless communication device 100 at the communication frequency.

More specifically, in the present method, the first state in which the opposite region 241 of the second conductor 25 and the conductor element 36a are opposite to each other is taken as the open state (FIG. 1A) of the wireless communication device 100. The second state in which the opposite region 241 and the conductor element 36a are separated from each other and are not opposite to each other is taken as the closed state (FIG. 1B) of the wireless communication device 100.

Figure 2:
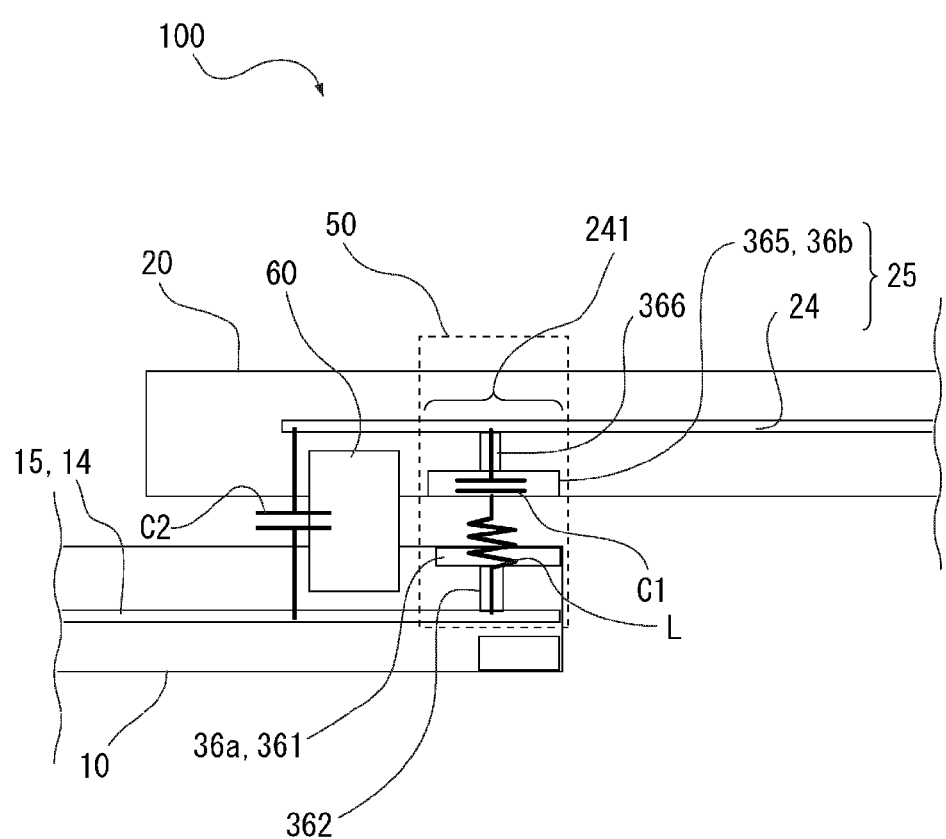
FIG. 2 is a diagram illustrating an equivalent circuit diagram of the wireless communication device in an open state.

FIG. 2 is a diagram illustrating an equivalent circuit diagram of the wireless communication device 100 in the open state (first state). The conductor element 36a and the second conductor 25 constitute a so-called right-handed-system electromagnetic band-gap (EBG) structure. The term "right-handed-system metamaterial" herein means an artificial material, having a positive refractive index, of which both the dielectric constant and the permeability are positive.

A unit cell 50 having an EBG structure according to the embodiment includes at least a pair of conductor planes parallel to each other and the conductor element 36a electrically connected to one of them. The first conductor 15 to which the conductor element 36a is connected and the second conductor 25 opposite to the conductor element 36a are equivalent to the respective conductor planes.

The first conductor 15 is a plane-shaped conductor present in the casing (first casing 10) located on the same side as the conductor element 36a. The term "plane-shaped" herein includes plane surface-shaped and curve-shaped. In the embodiment, an example of the first conductor 15 includes, but is not limited to, the conductor layer of the first circuit substrate 14. For example, a base plate or a movable plate constituting the coupling mechanism 60, an insert sheet metal of the casing or the like can also be formed as the first conductor 15. In addition, the first conductor 15 may be embedded in the first casing 10, and a portion or the entirety thereof may be exposed from the first casing 10.

The second conductor 25 is a conductor which is present in the casing (second casing 20) located on the opposite side to the conductor element 36a. The second casing 20 includes the conductor plane. In addition, as shown in FIGS. 1 and 2, the second conductor 25 according to the embodiment includes the second conductor element 36b in the predetermined opposite region 241 which is opposite to the conductor element 36a in the first state. That is, the second conductor 25 according to the embodiment is constituted by the second circuit substrate 24 and the second conductor element 36b. In the following, the conductor element 36a provided to the first circuit substrate 14 is referred to as the first conductor element 36a, and is differentiated from the second conductor element 36b.

In addition, as the conductor plane included in the second conductor 25, a base plate or a movable plate constituting the coupling mechanism 60, or an insert sheet metal of the casing can also be used in addition to the second circuit substrate 24.

The embodiment is a so-called mushroom-type EBG structure, and the unit cell 50 includes the conductor element 36a and the opposite region 241 which is opposite to the conductor element 36a in the first circuit substrate 14 and the second circuit substrate 24. Specifically, a plate-shaped opposite portion 361 in the conductor element 36a is equivalent to a mushroom head portion, and a connecting member 362 is equivalent to a mushroom inductance portion. In addition, the second circuit substrate 24 is equivalent to an upper conductor plane, and the first circuit substrate 14 is equivalent to a lower conductor plane.

Meanwhile, there are various types of EBG structures. The conductor element 36a may be formed on a different layer from the conductor plane as in the embodiment, and may be formed on the same layer.

Meanwhile, "the first conductor element 36a and the second conductor element 36b are opposite to each other" means that parts or all of the first conductor element 36a and the second conductor element 36b duplicate each other when seen from at least one perpendicular direction (normal direction) of the first circuit substrate 14 and the second circuit substrate 24.

The second conductor element 36b according to the embodiment forms a mushroom type similarly to the first conductor element 36a, and is constituted by a plate-shaped opposite portion 365 equivalent to the head portion and a connecting member 366 equivalent to the inductance portion. The connecting member 366 is connected to the second circuit substrate 24.

The first conductor element 36a and the second conductor element 36b are provided so as to protrude to the inner sides of the first conductor 15 (first circuit substrate 14) and the second conductor 25 (second circuit substrate 24) which are opposite to each other in the first state, respectively. Thereby, the interval between the first conductor element 36a and the second conductor 25 in the first state is equal to the perpendicular distance between the first conductor element 36a and the second conductor element 36b.

In the first state shown in FIG. 2, the plane-shaped first conductor 15 (first circuit substrate 14), the first conductor element 36a and the second conductor 25 constitute at least a portion of a metamaterial. The metamaterial electrically connects the first conductor element 36a to the second conductor (second circuit substrate 24) in the first state at a communication frequency of the wireless communication device 100. More specifically, the unit cell 50 of the metamaterial is constituted by the first conductor element 36a and the second conductor element 36b, and the first circuit substrate 14 and second circuit substrate 24 which belong to the opposite region 241. Thereby, the first conductor element 36a and the second conductor element 36b in the first state are physically separated from each other at a predetermined interval, but are short-circuited with respect to electromagnetic waves of the communication frequency.

More specifically, as shown in FIG. 2, the connecting members 362 and 366 function as an inductance L of the unit cell 50. In addition, the opposite portions 361 and 365 function as a first capacitance C1 of the unit cell 50. The first circuit substrate 14 and the second circuit substrate 24 function as a second capacitance C2 of the unit cell 50. In addition, when a plurality of first conductor elements 36a, not shown, are arranged on the first circuit substrate 14 so as to be adjacent to each other, a third capacitance is formed between the opposite portions 361 located next to each other. The same is true of the second conductor element 36b. Meanwhile, in FIG. 2, inductances and capacitances formed by the coupling mechanism 60 are not shown.

The inductance L, the first capacitance C1 and the second capacitance C2 mentioned above are adjusted to desired values, so that the unit cell 50 does not include a communication frequency of the wireless communication device 100 in a band-gap frequency, and causes the first circuit substrate 14 and the second circuit substrate 24 to allow electrical conduction to each other with respect to electromagnetic waves of the frequency. Thereby, the first circuit substrate 14 and the second circuit substrate 24 can be considered as a sheet of conductor at the communication frequency of the wireless communication device 100. For this reason, radio waves emitted by the antenna element 40 are prevented from being changed to a reversed phase in the first circuit substrate 14 and the second circuit substrate 24, and an adverse effect on the antenna characteristics of the antenna element 40 is reduced.

Even when there is one unit cell 50 of the metamaterial, the first circuit substrate 14 and the second circuit substrate 24 can be short-circuited to each other. However, it is preferable that unit a plurality of cells 50 are repeatedly arranged because the above-mentioned effect is increased. The arrangement pattern when a plurality of unit cells 50 are repeatedly arranged is not limited, but, for example, the periodical arrangement thereof is preferable.

Herein, when the "repeated" unit cells 50 are arranged, it is preferable that the interval (center-to-center distance) between the connecting members 362 is within ½ of wavelength λ of electromagnetic waves of the communication frequency (when there are plural frequencies, any of them) in the unit cells 50 located next to each other. In addition, "repeated" also includes a case where a portion of the configuration is missing in any of the unit cells 50. When the unit cells 50 have a two-dimensional array as in the embodiment, "repeated" also includes a case where the unit cells 50 is partially missing. In addition, "periodic" also includes a case where a portion of the components is out of alignment in some unit cells 50, or a case where the arrangement of some unit cells 50 themselves is out of alignment. That is, even when periodicity in a strict sense collapses, the characteristics as a metamaterial can be obtained when the unit cells 50 are repeatedly arranged, and thus some degree of defects are allowed in the "periodicity".

Meanwhile, factors for which these defects are generated include a manufacturing reason in a case of passing the interconnects, the vias, or the connecting members 362 and 366 between the unit cells 50. In addition to this, the factors include a case where the unit cells cannot be arranged by existing vias, patterns, or connecting members when a metamaterial structure is added to the existing interconnect layout or the connection structure between substrates, manufacturing errors, a case where the existing vias, patterns, or connecting members are used as a portion of the unit cell, or the like.

Meanwhile, in the embodiment, the second conductor element 36b is shown in a mushroom type similarly to the first conductor element 36a, but the invention is not limited thereto. In addition, the opposite portions 361 and 365 according to the embodiment are preferably formed in substantially the same shape and substantially the same dimensions, but are not necessarily limited thereto.

Herein, the impedance value of the wireless communication device 100 may fluctuate by relative displacement of the first conductor 15 and the second conductor 25 together with the first casing 10 and the second casing 20. Specifically, in the open state where the first casing 10 and the second casing 20 linearly extend in the reverse direction, the impedance values of the first casing 10 and the second casing 20 are generally larger than those in the closed state.

That is, the impedance value between the first conductor 15 and the second conductor 25 for the communication frequency of the wireless communication device 100 in the first state is different from that in the second state. Such impedance values mean values except that of the first conductor element 36a.

Specifically, the impedance value between the first conductor 15 and the second conductor 25 in the first state is larger than the impedance values in the second state. In the embodiment, the metamaterial including the first conductor element 36a is formed in the first state (open state), so that the impedance value of the wireless communication device 100 for the communication frequency is reduced, and the difference between the impedance values in the first state and the second state is reduced.

In addition, in the wireless communication device 100 according to the embodiment, the antenna element 40 is arranged further toward the upper end side than the coupling mechanism 60 in the first casing 10. For this reason, as shown in FIG. 1A, in the open state where the long-side directions of the first casing 10 and the second casing 20 are directed to the reverse direction centered on the coupling mechanism 60, the second conductor 25 (second circuit substrate 24) of the second casing 20 directly faces the antenna element 40, and the influence on the antenna characteristics becomes marked. In other words, the area of the second conductor 25 opposite to the antenna element 40 is larger in the open state than in the closed state. Herein, the direct facing of the conductor to the antenna element 40 means a case where the perpendicular line from the antenna element 40 down to the conductor intersects the conductor. In addition, the area of the conductor opposite to the antenna element 40 is the size corresponding to a viewing angle when the entirety of the conductor is seen from the antenna element 40.

In the embodiment, the EBG structure including the first conductor element 36a and the second conductor element 36b short-circuits electromagnetic waves of the communication frequency, so that the impedance values between the first conductor 15 and the second conductor 25 in the open state and the closed state are equalized. Thereby, the communication quality using the antenna element 40 is stabilized.

The first conductor element 36a and the second conductor element 36b are respectively provided to protrude in the perpendicular direction from the first circuit substrate 14 and the second circuit substrate 24, so that the perpendicular distance between the first conductor element 36a and the second conductor 25 (that is, second conductor element 36b) is set to a desired opposite interval when the first conductor element 36a is located at the predetermined opposite region 241. When the first conductor element 36a is separated from the opposite region 241 (second conductor element 36b) by the relative displacement of the first casing 10 and the second casing 20, the opposite interval between the first conductor element 36a and the second conductor 25 increases. Thereby, the second capacitance C2 formed between the first conductor element 36a and the second conductor 25 is set to a desired value only when the first conductor element 36a is present in the opposite region 241. For this reason, electromagnetic waves of a specific communication frequency of the wireless communication device 100 are electrically conducted between the first circuit substrate 14 and the second circuit substrate 24 in the open state, and are not electrically conducted in the closed state.

The embodiment allows various modifications. For example, in the above-mentioned embodiment, an aspect is exemplified in which the first and second conductor elements 36a and 36b are provided so as to protrude to each inner side of the first conductor 15 and the second conductor 25, but the invention is not limited thereto. At least one of the first conductor element 36a and the second conductor element 36b may be provided on the same layer as the first conductor 15 or the second conductor 25. Further, both the first conductor element 36a and the second conductor element 36b may be provided on the same layer as the first conductor 15 and the second conductor 25, respectively. Herein, in the embodiment, in the second conductor 25 constituted by the second circuit substrate 24 and the second conductor element 36b, the providing of the second conductor element 36b on the same layer as the second conductor 25 means that at least parts of the second conductor element 36b and the second circuit substrate 24 duplicate each other in the depthwise direction.

When a plurality of conductor elements are provided to at least one of the first conductor 15 and the second conductor 25, all of the plurality of conductor elements may be provided on the same layer as the corresponding conductor. Thereby, it is possible to suppress the dimensions in the depthwise direction of the corresponding conductor, and to reduce the thickness of the wireless communication device 100 on the whole. In addition, even when members, present in the surface of the casing, such as an insert sheet metal (metal shell) constituting the outer shell of the first casing 10 or the second casing 20, the coupling mechanism 60 and the like are formed as the first conductor 15 or the second conductor 25, the conductor elements do not protrude from the casing to the outside, and thus the operation of the coupling mechanism 60 is not obstructed.

Herein, a case where the first conductor element 36a is formed on the same layer as the first conductor 15 (conductor plane) will be described later with reference to FIGS. 10B and 11. In addition, when the second conductor element 36b is formed on the same layer as the second conductor 25, the opposite portion 365 of the second conductor element 36b may be locally provided to the conductor layer of the second circuit substrate 24 in an island shape, and the periphery thereof may be surrounded by an insulating material. The corresponding conductor layer and the opposite portion 365 may be connected to each other by a linear connecting member within the same layer.

In this manner, even when the second conductor element 36b is formed on the same layer as the second conductor 25 by locally arranging the second conductor element 36b in the opposite region 241 which is opposite to the first conductor element 36a in the first state, the first conductor 15 and the second conductor 25 can be caused to allow electrical conduction to each other at the communication frequency of the wireless communication device 100.

<Second Embodiment>

In the first embodiment, as a pair of conductor planes constituting the unit cell 50 of the metamaterial, an aspect is exemplified in which the first circuit substrate 14 and the second circuit substrate 24 are used. On the other hand, in the second embodiment, an aspect will be described in which a pair of metal members constituting the coupling mechanism (hinge mechanism) 60 are used as the conductor plane.

That is, the coupling mechanism 60 according to the embodiment includes at least one of first conductor 15 and the second conductor 25, and couples the first casing 10 and the second casing 20 so as to be displaceable.

FIGS. 3A to 3E are schematic plan views illustrating a rotational operation of the wireless communication device 100 according to the embodiment. For convenience, the display panel 22 is not shown in the drawings.

The coupling mechanism 60 includes a movable plate 61 on which a mounting shaft 62 is projected and a base plate 63 having a forked groove portion 64. The movable plate 61 is provided to the second casing 20, and the base plate 63 is provided to the first casing 10. The movable plate 61 and the base plate 63 are respectively fixed to the peripheries of the ends of the second casing 20 and the first casing 10. The first casing 10 and the second casing 20 are assembled so as to be displaceable by causing the movable plate 61 and the base plate 63 to be opposite to each other in a state where the mounting shaft 62 is inserted into the groove portion 64. The groove portion 64 forms two partial arc shapes, and guide pins (not shown) serving as rotational axes of the first casing 10 and the second casing 20 are provided in the vicinity of each origin for such an arc. The guide pins are fixed to one of the first casing 10 and the second casing 20, and are freely engaged and disengaged to the other thereof.

The movable plate 61 and the base plate 63 are made of the same or different kinds of metal material, and are all conductive.

The first conductor element 36a is connected to the base plate 63. That is, in the embodiment, the base plate 63 is equivalent to the first conductor 15. The movable plate 61 opposite to the first conductor element 36a is equivalent to the second conductor 25. In addition, similarly to the first embodiment, the second conductor element 36b is connected to the movable plate 61 (second conductor 25). The first conductor element 36a and the second conductor element 36b are provided so as to protrude to inner side of the base plate 63 and the movable plate 61, respectively.

In other words, the first embodiment is configured such that the first conductor element 36a and the second conductor element 36b are provided to circuit substrates (first circuit substrate 14 and second circuit substrate 24), while the present embodiment is configured such that the conductor elements are provided to the coupling mechanism 60. In this point, the two embodiments are different from each other.

The antenna element 40 is disposed further on the end side (upper end side in FIG. 3A) of the base plate 63 in the first casing 10.

The coupling mechanism 60 includes a plurality of stable states corresponding to the first state and the second state, respectively. More specifically, the wireless communication device 100 according to the embodiment includes the closed state (FIG. 3A) where the long-side directions of the first casing 10 and the second casing 20 are directed to the same direction centered on the coupling mechanism 60, the open state (FIG. 3E) where the long-side directions are directed to a reverse direction, and the intersection state (FIG. 3C) where the long-side directions are substantially at right angles to each other, as a stable state. Meanwhile, the vertical direction shown in FIG. 3A is equivalent to the long-side directions of the first casing 10 and the second casing 20, and the horizontal direction is equivalent to the width direction. The same is true of FIGS. 3B to 3E, and direction indications are not shown in the drawings.

In the closed state shown in FIG. 3A, the first conductor element 36a provided to the first casing 10 and the second conductor element 36b provided to the second casing 20 are located at positions not opposite to each other. That is, the closed state of the embodiment is equivalent to the second state where the EBG structure is not formed. The mounting shaft 62 in the closed state shown in FIG. 3A is located at a first end 64a (see FIG. 3E) of the groove portion 64. The mounting shaft 62 is biased toward the end 64a by an elastic member which is not shown in the drawings, and the first casing 10 and the second casing 20 are in a first stable state.

FIG. 3B illustrates a state where the second casing 20 in the closed state is rotated about 45 degrees counterclockwise with respect to the first casing 10. When a user puts the second casing 20 down sideways, the first casing 10 and the second casing 20 are rotated about the guide pins which are not shown in the drawings, and the mounting shaft 62 slides along the groove portion 64.

FIG. 3C illustrates an intersection state where the mounting shaft 62 reaches a second end 64b (see FIG. 3E) of the groove portion 64 and the second casing 20 is substantially at right angles to the first casing 10. At this time, the mounting shaft 62 is biased toward the end 64b by an elastic member which is not shown in the drawings, and the first casing 10 and the second casing 20 are in the second stable state. In addition, in such an intersection state, the first conductor element 36a and the second conductor element 36b are located at positions not opposite to each other. That is, the intersection state of the embodiment is also equivalent to the second state where the EBG structure is not formed.

FIG. 3D illustrates a state where the second casing 20 in the intersection state is further rotated about 45 degrees counterclockwise with respect to the first casing 10.

FIG. 3E illustrates an open state where the mounting shaft 62 reaches a third end 64c (see FIG. 3C) of the forked groove portion 64. At this time, the mounting shaft 62 is biased toward the end 64c by an elastic member which is not shown in the drawings, and the first casing 10 and the second casing 20 are in a third stable state.

In the open state, the first conductor element 36a and the second conductor element 36b are located at positions opposite to each other. Thereby, the EBG structure including the first conductor element 36a and the second conductor element 36b is formed, and electromagnetic waves of the communication frequency of the wireless communication device 100 are caused to allow electrical conduction between the movable plate 61 and the base plate 63. That is, the open state of the embodiment is equivalent to the first state where the EBG structure is formed. The equivalent circuit diagram of the EBG structure is in common with that of the first embodiment (see FIG. 2).

In the embodiment, the fluctuation in the impedance value of the coupling mechanism 60 when the relative position between the conductive movable plate 61 and the base plate 63 (first conductor 15 and second conductor 25) constituting the coupling mechanism (hinge mechanism) 60 is changed is reduced by the formation of the EBG structure.

Herein, the relative position between the first conductor 15 and the second conductor 25 means a relative translational position and a rotation angle thereof.

Meanwhile, in the embodiment, a case where the EBG structure is formed only in the open state is exemplified, but the invention is not limited thereto. That is, a plurality of conductor elements may be provided to one or both of the first conductor 15 and the second conductor 25, and a different set of conductor elements may be caused to be opposite to each other in a plurality of stable states of the wireless communication device 100.

In other words, the first conductor 15 or the second conductor 25 may include a third conductor element. In the second state where the first conductor element 36a and the second conductor element 36b are located at positions not opposite to each other, the first conductor element 36a or the second conductor element 36b, and the third conductor element may be opposite to each other to constitute at least a portion of the metamaterial. Thereby, the impedance value can be reduced by forming the EBG structure in a plurality of stable states of the wireless communication device 100.

In such a case, the inductances L or the second capacitances C2 (see FIG. 2) in the EBG structure formed in a plurality of stable states are caused to be different from each other, thereby allowing the difference between the impedance values of the wireless communication device 100 in each stable state to be further reduced. Specifically, another inductance element or capacitance element may be connected to any or all of the first to third conductor elements. Thereby, while the first to third conductor elements are formed in the same shape and formability thereof is increased, the inductances L or the second capacitances C2 of the EBG structure constituted by a different set of conductor elements can be caused to be different from each other.

According to the wireless communication device 100 of the above-mentioned first and second embodiment, when the first casing 10 and the second casing 20 which are rotationally displaced with each other around a perpendicular axis are relatively displaced, an adverse effect on the antenna characteristics of the antenna element 40 is reduced.

Herein, the relative position or angle between the casing grasped by a user with hands and another casing coupled thereto is hereinafter referred to as the state of the casings or the style of the casings. In a wireless communication device in which the casings are diversely rotationally displaced, various controls are performed depending on the state of the casing. For example, when the state of the casings is transitioned from a T-shaped intersection state to a longitudinal (I-shaped) open state, or from a longitudinal (I-shaped) open state to a T-shaped intersection state, a control is performed so that the directions of display information such as characters or images in the display portion are crossed 90 degrees and the display information directly faces to a user all the times.

For this reason, it is preferable to detect the state (style) of the displaced casings. It is preferable to detect the style of the casings without sacrificing the degree of freedom of the arrangement of electronic parts. According to the wireless communication device 100 of the following third and fourth embodiments, it is possible to suitably detect the style of the casings, and to suppress a fluctuation in the antenna characteristics at the time when the casings are rotated.

<Third Embodiment>

FIGS. 4A and 4B are schematic plan views illustrating the closed state and the open state of the wireless communication device 100 according to the embodiment.

Figure 5A:
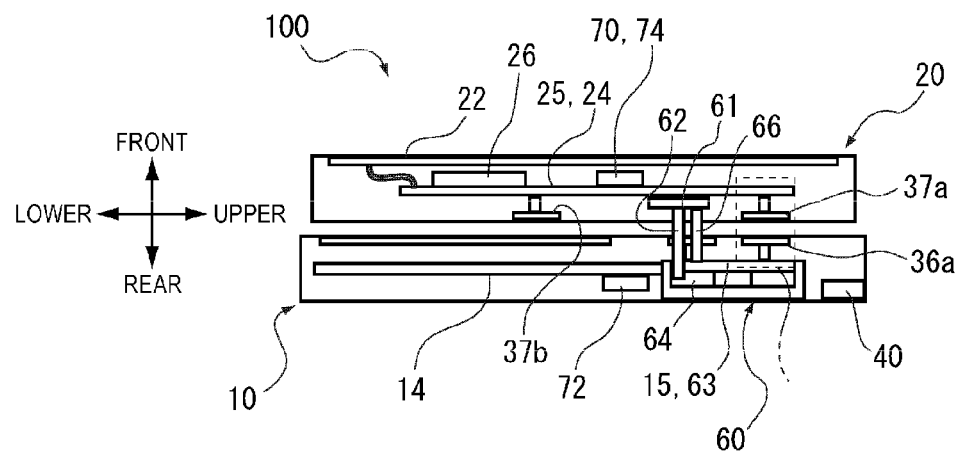
FIG. 5A is a cross-sectional view taken along the IIa-IIa line of FIG. 4A.
Figure 5B:
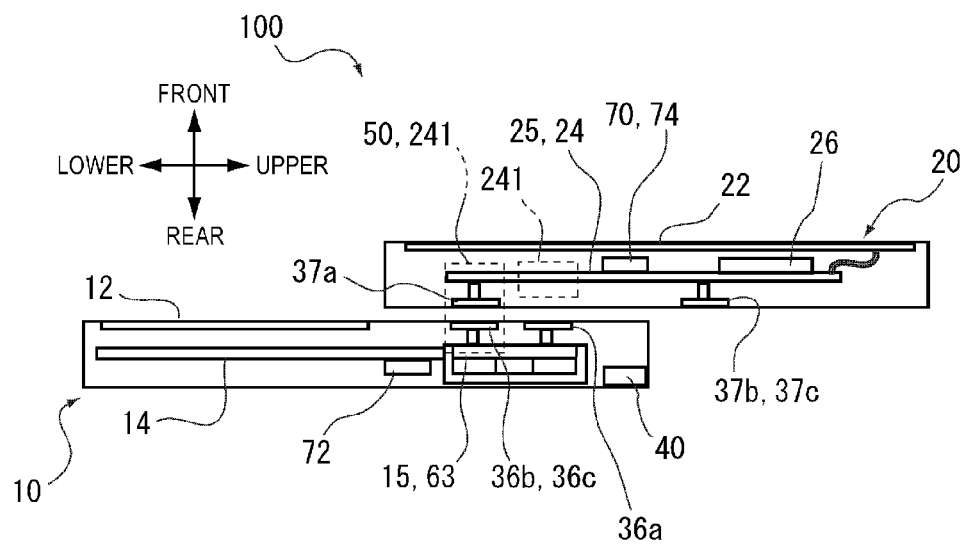
FIG. 5B is a cross-sectional view taken along the IIb-IIb line of FIG. 4B.

FIG. 5A is a cross-sectional view taken along the IIa-IIa line of FIG. 4A, and FIG. 5B is a cross-sectional view taken along the IIb-IIb line of FIG. 4B. FIGS. 5A and 5B are vertical cross-sectional views in which FIGS. 4A and 4B are cut in the depthwise direction.

The wireless communication device 100 according to the embodiment further includes a detection portion 70 that detects the electrical conduction state between the first conductor element 36a and the second conductor 25. The particulars duplicating the first or second embodiment will not be repeated.

Next, the wireless communication device 100 according to the embodiment will be described in detail. As shown in FIGS. 4A and 4B, in the embodiment, the first casing 10 and the second casing 20 form a substantially rectangular shape when seen in a plan view. The long-side direction in the closed state shown in FIG. 4A is set to a vertical direction, and the short-side direction of the first casing 10 is set to a width direction (horizontal direction). In addition, the front-back direction of paper equivalent to the perpendicular direction of the operation key 12 is set to a front-back direction of the wireless communication device 100.

As shown in FIGS. 5A and 5B, the first casing 10 is provided with the first circuit substrate 14 connected to the operation key 12 and the antenna element 40 that transmits and receives radio waves having a predetermined communication frequency.

The second casing 20 is a casing on the display side including a display output portion 22 that displays output information including characters or images. The display output portion 22 is a display panel such as a liquid crystal display device. The display output portion 22 according to the embodiment is provided substantially throughout the front of the second casing 20.

As shown in FIGS. 5A and 5B, the second casing 20 has the second circuit substrate 24 connected to the display output portion 22 built-in. A display control portion 26 mounted to the second circuit substrate 24 receives a signal from the first circuit substrate 14 through an interconnect (not shown) inserted into the coupling mechanism 60 and performs a control on the display output portion 22.

Meanwhile, in the embodiment, the casing provided with the first conductor element 36a is called the first casing 10. Therefore, when the first conductor element 36a is provided to the casing on the display side, the casing on the display side is equivalent to the first casing 10. In addition, the wireless communication device 100 is constituted by the first casing 10 and the second casing 20, and the coupling mechanism 60 that couples the first casing 10 to the second casing 20, or configuration members other than the antenna are included either the first casing 10 or the second casing 20.

Signals having various operating frequencies of the wireless communication device 100 are transmitted between the first circuit substrate 14 and the second circuit substrate 24. The first circuit substrate 14 and the second circuit substrate 24 are provided with conductor layers to which the constant potential such as a ground potential is given, substantially throughout each of the substrates.

The coupling mechanism 60 is a horizontal rotation type hinge that couples the first casing 10 and the second casing 20 so as to be rotatable with each other around a perpendicular axis. The coupling mechanism 60 according to the embodiment includes a plurality of stable states corresponding to the first state and the second state, respectively. In addition, the closed state where the long-side directions of the first casing 10 and the second casing 20 are directed to the same direction centered on the coupling mechanism 60 and the open state where the long-side directions are directed to a reverse direction are included as either the first state or the second state.

More specifically, FIGS. 4A and 5A illustrate the first state corresponding to the closed state of the casings. FIGS. 4B and 5B illustrate the second state corresponding to the open state of the casings. In the embodiment, "the casings have a plurality of states (styles)" means that the connection state between the first casing 10 and the second casing 20 have a different plurality of stable states.

The coupling mechanism 60 according to the embodiment includes the movable plate 61 on which the mounting shaft 62 is projected and the base plate 63 having the forked groove portion 64. The movable plate 61 and the base plate 63 are made of the same or different kinds of metal material, and are all conductive.

As shown in FIG. 5A, the movable plate 61 is provided to the second casing 20, and the base plate 63 is provided to the first casing 10. The movable plate 61 and the base plate 63 are respectively fixed to the peripheries of the ends of second casing 20 and the first casing 10. The first casing 10 and the second casing 20 are assembled so as to be displaceable by causing the movable plate 61 and the base plate 63 to be opposite to each other in a state where the mounting shaft 62 is inserted into the groove portion 64. The mounting shaft 62 is slidably fitted to the groove portion 64.

The movable plate 61 is electrically connected to a conductor layer (constant potential layer) of the second circuit substrate 24, and the base plate 63 is electrically connected to a conductor layer (constant potential layer) of the first circuit substrate 14. Thereby, it is possible to suppress an adverse effect of noise generated in the coupling mechanism 60 made of metal on the antenna characteristics of the antenna element 40.

The forked groove portion 64 forms two partial arc shapes, and guide pins 66 and 67 serving as rotational axes of the first casing 10 and the second casing 20 are provided in the vicinity of each origin for such an arc. The guide pins 66 and 67 are fixed to one of the first casing 10 and the second casing 20, and are freely engaged and disengaged to the other thereof.

More specifically, the guide pins 66 and 67 shown in FIGS. 4A and 4B are pivotally supported to the base plate 63 so as to be capable of being engaged and disengaged. Thereby, the movable plate 61 and the base plate 63 are relatively moved by the translational movement along the groove portion 64 and the rotational movement using any of the two guide pins 66 and 67 as the shaft center. Meanwhile, in FIG. 5B, the movable plate 61, the mounting shaft 62 and the guide pin 66 are not shown in the drawings for convenience.

The mounting shaft 62 in the closed state shown in FIG. 4A is located at the first end 64a (see FIG. 4B) of the groove portion 64. The mounting shaft 62 is biased toward the end 64a by an elastic member which is not shown in the drawings, and the first casing 10 and the second casing 20 are in the first stable state.

FIG. 4B illustrates an open state where the second casing 20 is rotated 180 degrees clockwise with respect to the first casing 10 from the closed state of FIG. 4A. A specific operation of the second casing 20 using the mounting shaft 62 and the guide pins 66 and 67 will be described later with reference to FIGS. 7A to 7C.

The first casing 10 includes the first conductor 15 and the first conductor element 36a. They may be embedded in the first casing 10, or a portion or the entirety thereof may be exposed to the outside.

The first conductor 15 is a plane-shaped conductor which is present in the casing (first casing 10 in the embodiment) located on the same side as the first conductor element 36a. In the embodiment, "plane-shaped" includes plane surface-shaped and curve-shaped.

In the embodiment, an example of the first conductor 15 includes, but is not limited to, the base plate 63. For example, the ground layer of the first circuit substrate 14 embedded in the first casing 10 may be used. Alternatively, when the first casing 10 is created by insert molding, the metal plate (insert sheet metal) buried in a resin material can also be used as the first conductor 15.

The first conductor 15 according to the embodiment includes the second conductor element 36b and a third conductor element 36c, in addition to the first conductor element 36a. The first to third conductor elements 36a to 36c are provided on the same layer as the base plate 63, or on a different layer protruding further to the front side than the base plate 63. In the embodiment, as shown in FIGS. 5A and 5B, each of the first to third conductor elements 36a to 36c forms mushroom shapes, and is provided so as to protrude to the front side of the base plate 63.

Meanwhile, the first conductor 15 according to the embodiment may be composed of two or more sheets of conductor planes. The first conductor 15 provided with the first conductor element 36a and the first conductor 15 provided with the second conductor element 36b or the third conductor element 36c may be the same conductor plane, and may be two or more sheets of conductor planes separated from each other. In the embodiment, an aspect is exemplified in which the common base plate 63 is provided with the first to third conductor elements 36a to 36c.

The second casing 20 includes the second conductor 25. The second conductor 25 is a conductor which is opposite to the first conductor element 36a at least in the first state. In the embodiment, the ground layer of the second circuit substrate 24 is exemplified as the second conductor 25. In addition to this, the movable plate 61 of the coupling mechanism 60 may be used as the second conductor 25, or the insert sheet metal of the second casing 20 may be used.

More specifically, as shown in FIGS. 5A and 5B, the second conductor 25 according to the embodiment is constituted by the second circuit substrate 24 and opposite elements 37a, 37b, and 37c formed so as to protrude to the back side of the second circuit substrate 24.

Meanwhile, in the embodiment, the movable plate 61 in which the opposite elements 37a, 37b, and 37c are all formed is exemplified as the second conductor 25. However, similarly to the first conductor 15, a plurality of conductor planes separated from each other may be included in the second conductor 25, and the opposite elements 37a, 37b, and 37c may be provided on a different conductor plane.

Hereinafter, a casing position detection method (hereinafter, sometimes referred to as the present detection method) achieved by the wireless communication device 100 according to the embodiment will be described.

The present detection method relates to a method of detecting a relative position between the first casing 10 and the second casing 20, in the wireless communication device 100 which includes the first casing 10 including the first conductor 15 and the first conductor element 36a connected to the first conductor 15, the second casing 20 including the second conductor 25, and the coupling mechanism 60 that couples the first casing 10 and the second casing 20 so as to be rotationally displaceable with respect to each other around a perpendicular axis.

As described above, the first state is a state where the first conductor element 36a and the second conductor 25 are opposite to each other at a predetermined interval, and the first conductor element 36a and the second conductor 25 allow electrical conduction to each other at a predetermined frequency.

The second state is a state where the electrical conduction state between the first conductor element 36a and the second conductor 25 is different from the first state.

The present detection method is characterized by detection of whether the relative position between the first casing 10 and the second casing 20 is in any of the first state and the second state by detecting the electrical conduction states between the first conductor element 36a and the second conductor 25 in the first state and the second state, respectively.

Herein, the relative position between the first casing 10 and the second casing 20 means a relative translational position and a rotation angle thereof.

As shown in FIG. 5A, the wireless communication device 100 according to the embodiment is configured such that in the closed state, the opposite element 37a formed so as to protrude to the back side of the second conductor 25 and the first conductor element 36a connected to the first conductor 15 are opposite to each other at a predetermined interval without interposing another conductor. That is, the opposite element 37a is formed in the partial region (opposite region 241) of the second circuit substrate 24 which is opposite to the first conductor element 36a in the first state. Such a state is the first state in the embodiment. The opposite distance between the first conductor element 36a and the second conductor 25 is equivalent to the perpendicular distance between the first conductor element 36a and the opposite element 37a.

Figure 6:
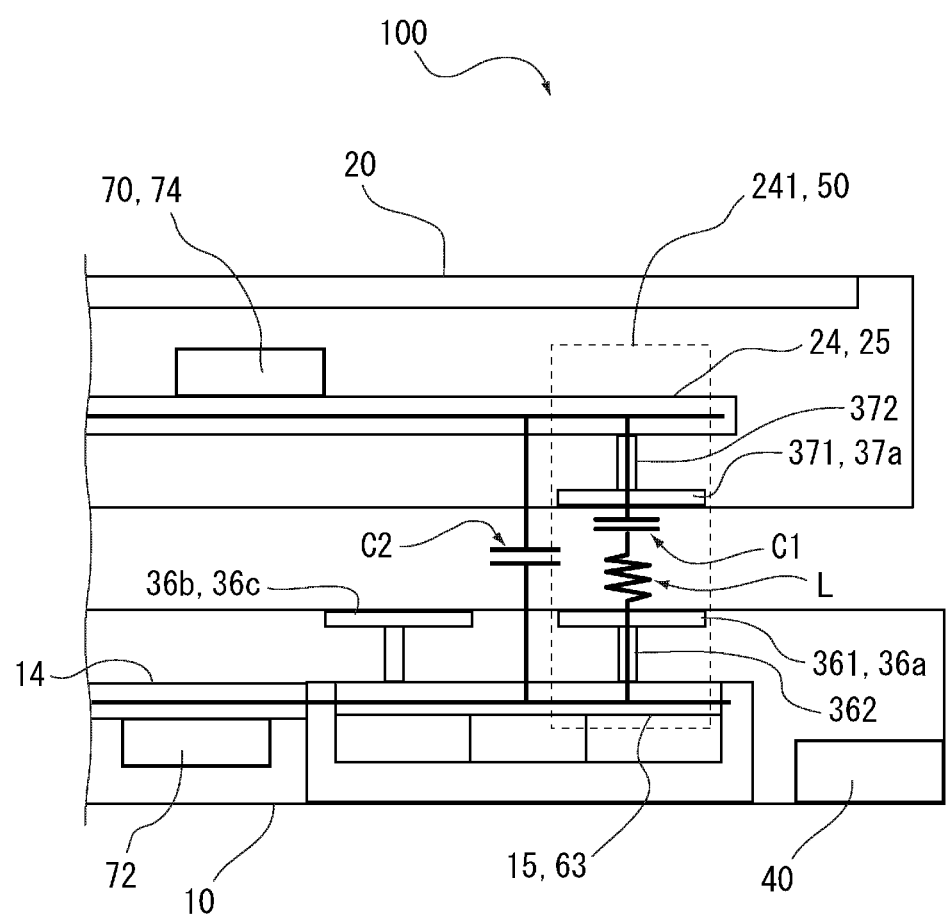
FIG. 6 is a diagram illustrating an equivalent circuit diagram of the wireless communication device in the open state (first state).

FIG. 6 is a diagram illustrating an equivalent circuit diagram of the wireless communication device 100 in the open state (first state). The movable plate 61 and the guide pin 66 are not shown in the drawing.

The first conductor element 36a and the second conductor 25 form a so-called right-handed-system electromagnetic band-gap (EBG) structure.

The unit cell 50 having an EBG structure according to the embodiment includes at least a pair of conductor planes which are parallel to each other and the first conductor element 36a connected to one of them. The first conductor 15 to which the first conductor element 36a is connected and the second conductor 25 which is opposite to the first conductor element 36a are equivalent to the respective pair of conductor planes.

The embodiment is a so-called mushroom-type EBG structure, and the unit cell 50 thereof includes the first conductor element 36a and the opposite region 241 which is opposite to the first conductor element 36a in the base plate 63 and the second circuit substrate 24.

The plate-shaped opposite portion 361 in the first conductor element 36a is equivalent to the head portion of the mushroom, and the connecting member 362 is equivalent to the inductance portion of the mushroom. In addition, the opposite region 241 in the conductor layer (constant potential layer) in the second circuit substrate 24 is equivalent to an upper conductor plane. The opposite region 241 in the base plate 63 is equivalent to a lower conductor plane.

Meanwhile, there are various types of EBG structures. The first conductor element 36a may be formed on a different layer from the conductor plane as in the embodiment, and may be formed on the same layer.

Meanwhile, "the first conductor element 36a and the opposite element 37a are opposite to each other" means that parts or all of the first conductor element 36a and the opposite element 37a duplicate each other when seen from at least one perpendicular direction (normal direction) of the first conductor 15 and the second conductor 25.

The opposite element 37a according to the embodiment forms a mushroom type similarly to the first conductor element 36a, and is constituted by a plate-shaped opposite portion 371 equivalent to the head portion and a connecting member 372 equivalent to the inductance portion. The connecting member 372 is connected to the second circuit substrate 24. That is, the opposite element 37a is another conductor element constituting the unit cell 50 of the EBG structure together with the first conductor element 36a, the base plate 63 (first conductor 15) and the second circuit substrate 24.

In the first state shown in FIG. 6, the plane-shaped first conductor 15 (base plate 63), the first conductor element 36a and the second conductor 25 constitute at least a portion of a metamaterial. More specifically, the metamaterial is constituted by the first conductor 15 (base plate 63), the first conductor element 36a, and the second conductor 25 (second circuit substrate 24 and opposite element 37a).

The metamaterial electrically connects the first conductor element 36a to the second conductor 25 at a predetermined frequency. Thereby, the first conductor element 36a and the opposite element 37a in the first state are physically separated from each other at a predetermined interval, but are short-circuited with respect to electromagnetic waves having a predetermined frequency. Hereinafter, the frequency are sometimes referred to as a short-circuit frequency.

More specifically, as shown in FIG. 6, the connecting members 362 and 372 function the inductance L of the unit cell 50. In addition, the opposite portion 361 and 371 function as the first capacitance C1 of the unit cell 50. The base plate 63 and the second circuit substrate 24 function as the second capacitance C2 of the unit cell 50. In addition, when a plurality of first conductor elements 36a, not shown, are arranged on the first conductor 15 so as to be adjacent to each other, the third capacitance is formed between the opposite portions 361 located next to each other.

The same is true of the opposite element 37a. When a plurality of opposite elements 37a are opposite to the respective first conductor elements 36a, another capacitance is formed between the opposite portions 371 located next to each other.

The unit cell 50 causes the first conductor 15 and the second conductor 25 to allow electrical conduction to each other with respect to electromagnetic waves of a predetermined short-circuit frequency by adjusting the inductance L, the first capacitance C1 and the second capacitance C2 mentioned above.

The detection portion 70 includes an application portion 72 that applies a current (detection current) of the predetermined short-circuit frequency between the first conductor element 36a and the second conductor 25, and a current detection portion 74 that detects the current between the first conductor element 36a and the second conductor 25.

The detection of the current between the first conductor element 36a and the second conductor 25 by the current detection portion 74 means that predetermined electrical characteristics are detected by electrical conduction between the first conductor element 36a and the second conductor 25. Specifically, the current detection portion 74 is a circuit or a sensor having a function for detecting the magnitude of the electrical characteristics such as a voltage or impedance between the first conductor element 36a and the second conductor 25, in addition to a case where it has a function of an ammeter. The current detection portion 74 may be a device for quantitatively measuring predetermined electrical characteristics, or may be a device for detecting that desired electrical characteristics is equal to or more than the threshold or equal to or less than the threshold.

The current detection portion 74 of the detection portion 70 detects whether the first conductor element 36a and the second conductor 25 (second circuit substrate 24 or opposite element 37a) allow electrical conduction to each other with respect to the current of the predetermined short-circuit frequency applied by the application portion 72, or the degree of the electrical conduction.

FIG. 6 is illustrative of a state where the application portion 72 is provided to the first circuit substrate 14 and the current detection portion 74 is provided to the second circuit substrate 24, but the invention is not limited thereto.

The short-circuit frequency between the first conductor element 36a and the second conductor 25 is not particularly limited. The short-circuit frequency may be a clock frequency of the wireless communication device 100, may be a communication frequency of the antenna element 40, or may be an arbitrary frequency for detection by the current detection portion 74.

In the embodiment, this predetermined short-circuit frequency is set to the communication frequency of the antenna element 40 included in the wireless communication device 100. Thereby, in the communication frequency (when there are plural frequencies, any of them) of the wireless communication device 100, the first circuit substrate 14, the base plate 63, the movable plate 61 and the second circuit substrate 24 can be considered as a sheet of conductor. For this reason, current noise caused by radio waves emitted by the antenna element 40 is prevented from flowing as a reversed phase between the first circuit substrate 14 and the second circuit substrate 24, and an adverse effect on the antenna characteristics of the antenna element 40 is reduced.

Herein, the current detection portion 74 detects current noise from the antenna element 40 and thus detects the electrical conduction between the first conductor element 36a and the second conductor 25, more specifically, the first conductor element 36a and the opposite element 37a. Thereby, the detection current is not applied by the application portion 72, or power required for the detection current is extremely reduced, thereby allowing the electrical conduction state between the first conductor element 36a and the second conductor 25 in the first state to be detected by the current detection portion 74.

Meanwhile, even when the number of the unit cells 50 of the metamaterial is one, the first conductor 15 and the second conductor 25 can be short-circuited to each other. However, it is preferable that a plurality of unit cells 50 are repeatedly arranged because the above-mentioned effect is increased. The arrangement pattern when a plurality of unit cells 50 are repeatedly arranged is not limited, but, for example, the periodical arrangement thereof is preferable.

Meanwhile, in the embodiment, the opposite element 37a is shown in a mushroom type similarly to the first conductor element 36a, but the invention is not limited thereto. In addition, the opposite portions 361 and 371 according to the embodiment are preferably formed in substantially the same shape and substantially the same dimensions, but are not necessarily limited thereto.

In the open state shown in FIG. 5B, the second casing 20 is displaced with respect to the first casing 10, and thus the first conductor element 36a and the opposite element 37a are not opposite to each other. That is, the predetermined region (opposite region 241) which is opposite to the conductor element 36a in the first state in the second conductor 25 is located at a position not opposite to the conductor element 36a in the second state. In addition, the opposite elements 37b and 37c are also formed in different regions from the opposite region 241. For this reason, the opposite distance between the first conductor element 36a and the second conductor 25 is equivalent to the perpendicular distance between the first conductor element 36a and the second circuit substrate 24. Therefore, the opposite distance between the first conductor element 36a and the second conductor 25 in the open state of the casings is larger than the opposite distance in the closed state (first state) of the casings.

Thereby, the first conductor element 36a does not form the predetermined first capacitance C1 and second capacitance C2, and the first conductor element 36a and the second conductor 25 are insulated from each other with respect to the above-mentioned short-circuit frequency, or the electrical conduction state (electrical characteristics) is changed in the first state. Such an open state is equivalent to the second state of the casings.

The current detection portion 74 can grasp the state (style) of the casings by detecting the electrical characteristics between the first conductor element 36a and the second conductor 25 in the first state and the second state.

As shown in FIGS. 5A and 5B, the wireless communication device 100 includes the display output portion 22 and the display control portion 26. The display output portion 22 is a display portion that displays output information including characters or images, and the display control portion 26 is a control portion that switches the direction of the output information displayed on the display output portion 22 in multiple ways.

The display control portion 26 according to the embodiment switches the direction of the output information between the first state and the second state on the basis of the detection result of the detection portion 70.

The output information is directional information, and the output direction is switched depending on the state (style) of the casings, thereby allowing a user to match the vertical direction and the direction of the output information all the times. In the embodiment, in the first state (closed state) shown in FIG. 4A, the coupling mechanism 60 side (hinge side) equivalent to the upper side of FIG. 4A in the display output portion 22 is set to the upper side, or any of the right and left sides is set to the upper side, by way of example, and thus the output information may be displayed and output. In the second state (open state) shown in FIG. 4B, the hinge side in the display output portion 22 is set to the lower side and thus the output information may be displayed and output.

That is, according to the wireless communication device 100 of the embodiment, the following information display method (hereinafter, sometimes referred to as the present display method) is achieved.

The present display method relates to a method of displaying output information in the display output portion 22 provided to any of the first casing 10 and the second casing 20, in the wireless communication device 100 which includes the first casing 10 including the first conductor 15 and the first conductor element 36a connected to the first conductor 15, the second casing 20 including the second conductor 25, and the coupling mechanism 60 that couples the first casing 10 and the second casing 20 so as to be rotationally displaceable with respect to each other around a perpendicular axis.

The present display method includes a detection step performed between the first state and the second state, and a display step switching the direction of the output information displayed on the display output portion 22 between the first state and the second state on the basis of the detected result.

In the detection step, it is detected whether the relative position between the first casing 10 and the second casing 20 is in any of the first state and the second state by detecting the electrical conduction state between the first conductor element 36a and the second conductor 25.

As described above, the first state is a state where the first conductor element 36a and the second conductor 25 are opposite to each other at a predetermined interval, and the first conductor element 36a and the second conductor 25 allow electrical conduction to each other at a predetermined frequency. The second state is a state where the electrical conduction state between the first conductor element 36a and the second conductor 25 is different from the first state.

In the display step, the direction of the output information displayed on the display output portion 22 is switched by the display control portion 26. Herein, the switching of the direction of the output information by the display control portion 26 includes a case where the direction of the output information is changed mutually between the first state and the second state, and a case where the direction of the output information is changed only when the casings are transitioned from the first state to the second state, or from the second state to the first state.

That is, in the display step of the present display method, the display control portion 26 displays the output information in the directions different from each other in the first state and the second state, on the basis of the result detected by the current detection portion 74.

In the embodiment, a case where the casings have two styles of the closed state and the open state has been described by way of example, but the invention is not limited thereto.

The casings may have three or more styles. Hereinafter, such a case will be described in a fourth embodiment.

<Fourth Embodiment>

The wireless communication device 100 according to the embodiment has the intersection state where the long-side directions of the first casing 10 and the second casing 20 are substantially at right angles to each other centered on the coupling mechanism 60, as a third state, in addition to the closed state and the open state shown in FIGS. 4A and 4B.

FIGS. 7A, 7B, and 7C are schematic plan views illustrating the wireless communication device 100 according to the embodiment.

FIG. 7B illustrates an intersection state of the casings. FIG. 7A illustrates a first transition state on the way of transition from the closed state (FIG. 4A) to the intersection state, and FIG. 7C illustrates a second transition state on the way of transition from the intersection state to the open state (FIG. 4B).

Figure 8:
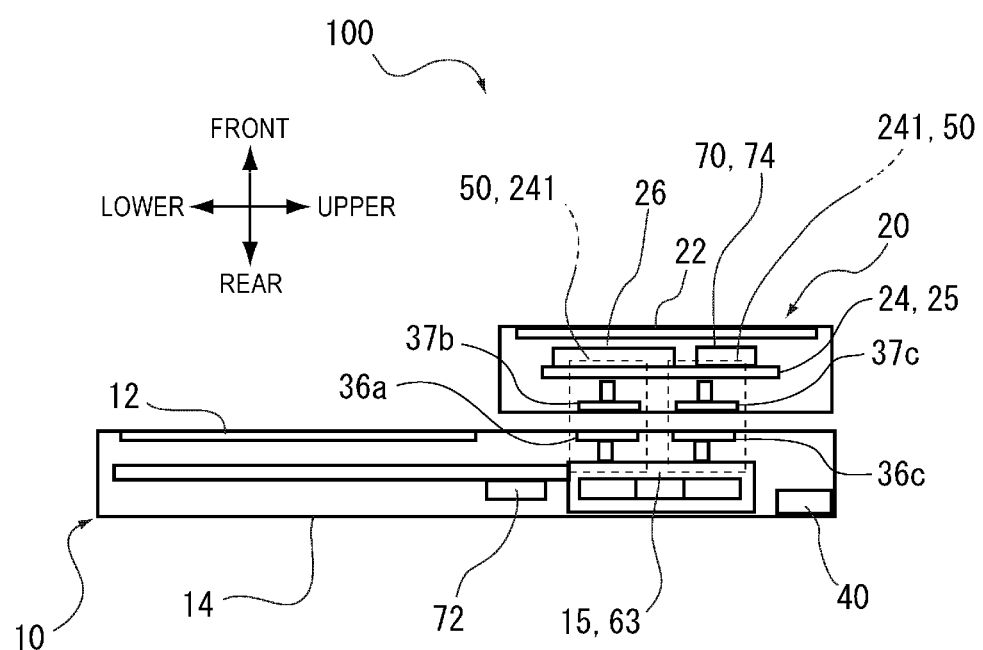
FIG. 8 is a cross-sectional view taken along the V-V line of FIG. 7B.

FIG. 8 is a cross-sectional view taken along the V-V line of FIG. 7B, and corresponds to a vertical cross-sectional view in which FIG. 7B is cut in the depthwise direction.

The third state is a state where the electrical conduction state between the first conductor element 36a and the second conductor 25 is different from the first state and the second state. The coupling mechanism 60 further includes another stable state corresponding to the third state.

A state where the second casing 20 is rotated about 45 degrees clockwise with respect to the first casing 10 from the closed state shown in FIG. 4A is the first transition state shown in FIG. 7B. When a user puts the second casing 20 in the closed state down sideways, the first casing 10 and the second casing 20 are rotated around the guide pin 66, and the mounting shaft 62 slides along the groove portion 64. Thereby, the movable plate 61 and the base plate 63 are rotated around the guide pin 66 while being maintained parallel to each other.

In the first transition state, the first conductor element 36a and the opposite element 37a are separated from each other, and the first to third conductor elements 36a to 36c and the opposite elements 37a to 37c are all not opposite to each other.

In the intersection state of FIG. 7B, the mounting shaft 62 reaches the second end 64b (see FIG. 4A) of the groove portion 64, and the second casing 20 is substantially at right angles to the first casing 10. At this time, the mounting shaft 62 is biased toward the end 64b by an elastic member which is not shown in the drawings, and the first casing 10 and the second casing 20 are in the stable state. In addition, in such an intersection state, as shown in FIG. 8, the first conductor element 36a and the opposite element 37b, and the third conductor element 36c and the opposite element 37c are respectively located at positions opposite to each other. That is, in the intersection state of the embodiment, the unit cell 50 of the EBG structure including the third conductor element 36c is formed. Meanwhile, in the intersection state, the unit cell 50 of the EBG structure including the first conductor element 36a is also formed simultaneously, but this is arbitrary. Meanwhile, the formation of the EBG structure means that a predetermined electromagnetic band-gap is generated.

A state where the second casing 20 is rotated about 45 degrees clockwise with respect to the first casing 10 from the intersection state of FIG. 7B is the second transition state of FIG. 7C. The second casing 20 is rotated around the first casing 10 centered on the guide pin 67, and the mounting shaft 62 slides from the end 64b toward the end 64c (see FIG. 4A) along the groove portion 64. When the mounting shaft 62 leads to the end 64c, the mounting shaft 62 is biased toward the end 64c by an elastic member which is not shown in the drawings, the casings are stabilized in the open state.

In the open state shown in FIG. 4B, the second conductor element 36b and the opposite element 37a are opposite to each other as described above, and the unit cell 50 of the EBG structure is formed (see FIG. 5B).

That is, in the first state (closed state), the first conductor element 36a, the first conductor 15 and the second conductor 25 constitute at least a portion of a metamaterial. in the second state (open state) or the third state (intersection state), the second conductor element 36b, the first conductor 15 and the second conductor 25 constitute at least a portion of a metamaterial.

These metamaterials electrically connect the first conductor 15 to the second conductor 25 at a predetermined frequency in at least one of the second state (open state) and the third state (intersection state), in addition to the first state (closed state). In other words, the opposite elements 37a to 37c are other conductor elements provided so as to protrude on a region opposite to the first conductor element 36a in the first state and a region opposite to the second conductor element 36b in the second state or the third state.

In the embodiment, the second conductor element 36b constitutes a metamaterial in the second state (open state), and the third conductor element 36c constitutes a metamaterial in the third state (intersection state). For this reason, when the electrical conduction between the first conductor element 36a and the opposite element 37a is detected by the current detection portion 74, the detection portion 70 can determine that the casings are in the first state (closed state). In addition, when the electrical conduction between the second conductor element 36b and the opposite element 37a is detected by the current detection portion 74, the detection portion 70 can determine that the casings are in the second state (open state). When the electrical conduction between the third conductor element 36c and the opposite element 37c is detected by the current detection portion 74, the detection portion 70 can determine that the casings are in the third state (intersection state).

In this manner, the wireless communication device 100 according to the embodiment further includes the third conductor element 36c connected to the first conductor 15 or the second conductor 25, and different one or more of the first conductor element 36a, the second conductor element 36b and the third conductor element 36c constitute a metamaterial in the first state, the second state and the third state.

Herein, the constitution of a metamaterial by different one or more of the conductor elements in the first to third states means that combinations of opposite pairs of the first to third conductor elements 36a to 36c and the opposite elements 37a to 37c are not completely the same as each other in any two or more of the first to third states. For example, when pairs of the first conductor element 36a and the opposite element 37a are opposite to each other in two states, the other pairs are opposite to each other simultaneously, so that it is necessary that the two states can be identified with each other.

The current detection portion 74 can identify three styles of the casings by detecting the detection current of the short-circuit frequency with respect to the unit cell 50 of the EBG structure formed in the first to third states.

The same is true of a case where the number of styles of the casings is four or more. The conductor elements may be disposed in one or both of the first casing 10 and the second casing 20 so that the EBG structures formed each state or the combinations thereof are not completely the same as each other.

The embodiment further includes the second conductor element 36b connected to any one of (first conductor 15 in the embodiment) the first conductor 15 and the second conductor 25, in addition to the first conductor element 36a. In the second state or the third state, the second conductor element 36b and the other (second conductor 25 in the embodiment) of the first conductor 15 and the second conductor 25 are opposite to each other, and the first conductor 15 and the second conductor 25 allow electrical conduction to each other at a predetermined frequency. In this manner, two conductor elements are disposed in the first conductor 15 or the second conductor 25, and the presence or absence of the electrical conduction of the detection current of each conductor element is detected, thereby allowing the total four styles of the casings to be identified.

In the embodiment, the third conductor element 36c is further included, and thus it is possible to detect various styles of the casings, and to enhance reliability of the detection.

The current detection portion 74 may be individually provided to the first to third conductor elements 36a to 36c. In this case, the first conductors 15 to which the first to third conductor elements 36a to 36c are connected may be formed as other conductor planes. Thereby, it is possible to exclude the influence of the electrical conduction of another conductor element at the time of detecting the presence or absence of the electrical conduction of the detection current in arbitrary conductor elements.

In addition, both the short-circuit frequency applied to a metamaterial constituted by the first conductor 15 in the first state and the short-circuit frequency applied to a metamaterial constituted by the second conductor 25 in the second state or the third state may be the communication frequency of the antenna element 40 included in the wireless communication device 100.

When the short-circuit frequency conducted by the metamaterial formed in each state is the communication frequency, as described above, the state of the casings can be grasped by the detection of the electrical conduction of current noise caused by the antenna element 40 between the conductor elements. Meanwhile, when the wireless communication device 100 includes a plurality of communication frequencies, the short-circuit frequencies may be common, or may be different from each other.

The first conductor element 36a, the second conductor element 36b and the third conductor element 36c are disposed in three different regions in at least one (first conductor 15 in the embodiment) of the first conductor 15 and the second conductor 25.

The first conductor element 36a and the second conductor element 36b are provided at the inner sides opposite to each other in the first conductor 15 or second conductor 25 (first conductor 15 in the embodiment) so as to protrude. The third conductor elements 36c are also provided at the inner sides opposite to each other in the first conductor 15 or the second conductor 25 so as to protrude. Thereby, the first to third conductor elements 36a to 36c and the second conductor 25 opposite thereto can be caused to close to the perpendicular direction. For this reason, it is possible to reduce an area of the opposite portion 361 for fabricating predetermined capacitance (C1).

The conductive opposite element 37a is provided in the predetermined region (opposite region 241) which is opposite to the first conductor element 36a in the first state in the second conductor 25. Further, in the embodiment, the opposite elements 37a to 37c as many as the first to third conductor elements 36a to 36c are provided to the first conductor 15 or the second conductor 25 (second conductor 25 in the embodiment) which is opposite to the conductor elements.

The first conductor element 36a and the opposite element 37a are provided at the inner sides opposite to each other in the first conductor 15 and the second conductor 25 so as to protrude. In addition, the same is true of the second conductor element 36b, the third conductor element 36c, and the opposite elements 37b and 37c.

Thereby, the EBG structure is formed only in the stable state where any of the first to third conductor elements 36a to 36c and the opposite elements 37a to 37c are opposite to each other, and the EBG structure is not formed in the transition state (FIGS. 7A and 7C) of the casings. Thereby, the detection portion 70 can exactly grasp the transition state of the casings.

However, instead of the embodiment, at least one of the first conductor element 36a and the opposite element 37a may be provided on the same layer as the first conductor 15 or the second conductor 25. The same is true of the second conductor element 36b, the third conductor element 36c, and the opposite element 37b, 37c. Herein, in the second conductor 25 of the embodiment constituted by the second circuit substrate 24 and the opposite elements 37a to 37c, the providing of the opposite elements 37a to 37c on the same layer as the second conductor 25 means that at least parts of the opposite elements 37a to 37c and the second circuit substrate 24 duplicate each other in the depthwise direction.

For at least one of the first conductor 15 and the second conductor 25, all the conductor elements or the opposite elements provided thereto may be provided on the same layer as the corresponding conductor. Thereby, it is possible to suppress the dimensions of the corresponding conductor in the depthwise direction, and to reduce the thickness of the wireless communication device 100 as a whole. In addition, even when members, present in the surface of the casing, such as an insert sheet metal (metal shell) constituting the outer shell of the first casing 10 or the second casing 20, the coupling mechanism 60 or the like are formed as the first conductor 15 or the second conductor 25, the conductor elements or the opposite elements do not protrude from the casing to the outside, and thus the operation of the coupling mechanism 60 is not obstructed.

Herein, a case where the conductor elements 36a to 36c are formed on the same layer as the first conductor 15 (conductor plane) will be described later with reference to FIGS. 10B, 11A, and 11B. In addition, when the opposite elements 37a to 37c are formed on the same layer as the second conductor 25, the opposite portion 371 may be locally provided to the conductor layer of the second circuit substrate 24 in an island shape, and the periphery thereof may be surrounded by an insulating material. The corresponding conductor layer and the opposite portion 371 may be connected to each other by a linear connecting member within the same layer.

In this manner, even when the opposite elements 37a to 37c are formed on the same layer as the second conductor 25 by locally arranging the opposite elements 37a to 37c in positions which are opposite to any of the conductor elements 36a to 36c in the first to third states, the state (style) of the casings can be detected.

At this time, according to the embodiment, the style of the casings can be detected without using a permanent magnet. For this reason, at the time of using electronic parts generally easily influenced by magnetism in the wireless communication device 100, there is no restriction on the arrangement thereof. Therefore, it is possible to achieve miniaturization of the wireless communication device 100 and complication of the operation of the hinge mechanism.

Herein, the impedance value of the wireless communication device 100 may fluctuate by relative displacement of the first conductor 15 and the second conductor 25 together with the first casing 10 and the second casing 20. Specifically, as compared to the closed state (FIG. 4A) where the first casing 10 and the second casing 20 overlap each other, in the open state (FIG. 4B) where they linearly extend in the reverse direction or in the intersection state (FIG. 7B) where they are substantially at right angles to each other, the impedance values of the first casing 10 and the second casing 20 may increase.

That is, the impedance value of the first casing 10 and the second casing 20 are different from each other in the first to third states with respect to electromagnetic waves of the predetermined short-circuit frequency. The "impedance value" herein means a value except those of the first to third conductor elements 36a to 36c.

In the embodiment, in the first to third states, the EBG structure is formed by different one or more of the first conductor element 36a, the second conductor element 36b and the third conductor element 36c. Thereby, it is possible to reduce the difference between the impedance values of the wireless communication device 100 for the short-circuit frequency by adjusting the inductance or the capacitance of each EBG structure.

In the embodiment, the impedance values of the first casing 10 and the second casing 20 for the communication frequency of the wireless communication device 100 in the first state are different from those in the second state (and the third state).

In addition, according to wireless communication device 100 of the embodiment, an impedance adjustment method is provided in which the conductor element 36a opposite to the second conductor 25 at a predetermined interval is caused to resonate at a communication frequency of the wireless communication device 100 in the open state or the closed state (or the intersection state), to thereby reduce the impedance of the wireless communication device 100 at the communication frequency.

In the wireless communication device 100 of the embodiment, the amount of fluctuation in the impedance value of the coupling mechanism 60 by displacement of the first casing 10 and the second casing 20 between the closed state, the intersection state and the open state can be reduced by the EBG structure which is alternatively formed in the open state.

(With Respect to Conductor Element)

The conductor elements used in the embodiment will be described in detail.

The so-called mushroom-type conductor element 36a shown in FIGS. 1A, 1B, 2, and 6 includes the plate-shaped opposite portion 361 laminated on a different layer from the first conductor 15, and the columnar connecting member 362 disposed upright thereon. Such an EBG structure is sometimes referred to as a patch type.

As the EBG structure used in the embodiment, a microstrip line provided with a linear transmission line can also be used instead of the patch type. Specifically, an open stub structure is formed in which one end of the microstrip line is connected to the first conductor 15, and the other end thereof serves as an open end. Hereinafter, such an EBG structure is sometimes referred to as an open stub type.

Even in the patch type and the open stub type, the opposite portion 361 may be formed on the same layer as the first conductor 15 in an island shape, or the opposite portion 361 may be formed on a different layer from the first conductor 15 as in the above-mentioned embodiment. Further, a linear element for increasing the inductance may be added to the opposite portion 361 or the connecting member 362.

These EBG structures will be described below as modified examples of the embodiment.

A feature common to the EBG structures used in the embodiment includes a point in which a pair of conductor planes (first conductor 15 and second conductor 25) opposite to each other and the opposite portion 361 are included, and the opposite portion 361 is separated from one conductor plane (second conductor 25). Thereby, in the EBG structure of the embodiment, interlayer sliding is allowed in the inside of the unit cell 50.

Figure 9A:
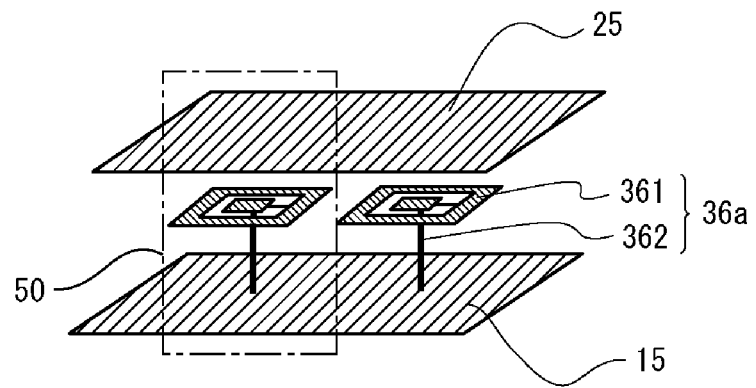
FIG. 9A is a perspective view for explaining a first modified example of a unit cell.
Figure 9B:
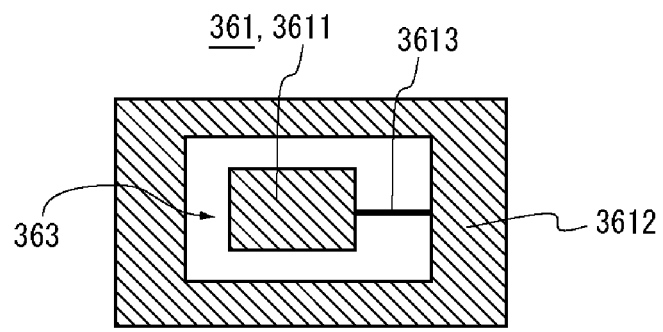
FIG. 9B is a plan view of an opposite portion.

FIG. 9A is a perspective view for explaining a first modified example of the unit cell 50, and FIG. 9B is a plan view illustrating the opposite portion 361 shown in FIG. 9A. In the modified example, the unit cell 50 is different from the conductor element 36a shown in FIG. 2, in that the opposite portion 361 is separated into a first conductor strip 3611 and a second conductor strip 3612. In the conductor element 36a of the modified example, the first conductor strip 3611 and the second conductor strip 3612 are patches formed on the same layer. The rectangular first conductor strip 3611 is provided in an island shape in the inside of an opening 363 of the second conductor strip 3612 formed in a rectangular frame shape. The first conductor strip 3611 and the second conductor strip 3612 are connected to each other by an interconnect 3613 provided on the same layer as the conductor strips. The width dimension (vertical dimension of FIG. 9B) of the interconnect 3613 is smaller than the dimension of the first conductor strip 3611. Meanwhile, the connecting member 362 is connected to the first conductor strip 3611.

Figure 9C:
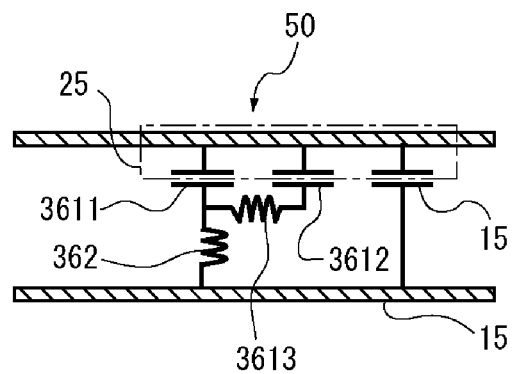
FIG. 9C is an explanatory diagram of an equivalent circuit of the unit cell.

FIG. 9C is an explanatory diagram illustrating an equivalent circuit of the unit cell 50 shown in FIG. 9A. Similarly to the example shown in FIG. 2, the connecting member 362 functions as a first inductance element of the unit cell 50. In addition, the first conductor strip 3611 and the second conductor 25 function as first capacitance, and the first conductor 15 and the second conductor 25 function as second capacitance of the unit cell 50. In addition, as shown in FIG. 9A, when the unit cells 50 are disposed adjacent to each other, third capacitance is formed between the opposite portions 361 located next to each other (not shown in FIG. 9C). Further, the second conductor strip 3612 and the second conductor 25 function as fourth capacitance of the unit cell 50.

The interconnect 3613 functions as a second inductance element. The inductance element is provided in series with the fourth capacitance. In addition, the second inductance element and the fourth capacitance are in parallel with the first capacitance (first conductor strip 3611).

According to the modified example, the inductance element and the capacitance of the unit cell 50 increase, and thus the span of adjustable range of the characteristics of the metamaterial becomes larger.

Figure 10A:
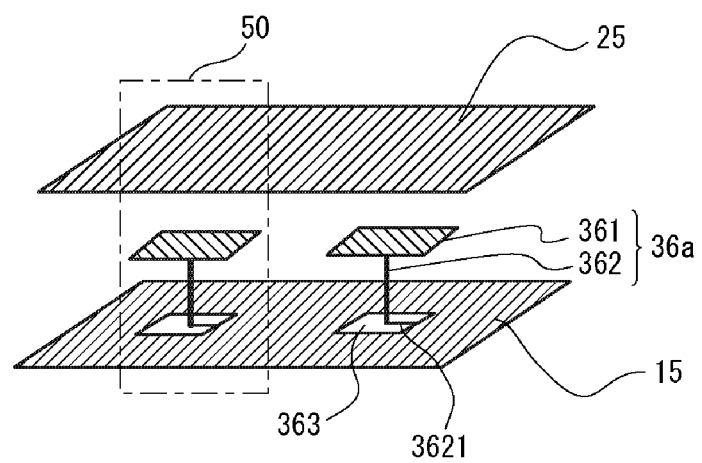
FIG. 10A is a perspective view for explaining a second modified example of the unit cell.

FIG. 10A is a perspective view for explaining a second modified example of the unit cell 50. In the modified example, the unit cell 50 is different from the conductor element 36a shown in FIG. 2, in that the opening 363 is formed in a region which is opposite to the opposite portion 361 in the first conductor 15, and the connecting member 362 and the first conductor 15 are connected to each other by an interconnect 3621. The lower-end position of the connecting member 362 shown in FIG. 10A, that is, the position of the connecting member 362 within the layer of the first conductor 15 is located inside the opening 363.

Meanwhile, the sizes of the opening 363 and the opposite portion 361 are not particularly limited. In the embodiment, the opposite portion 361 is made to be larger than the opening 363, and the opposite portion 361 includes the opening 363 when the first conductor 15 is seen in the perpendicular direction.

The equivalent circuit of the unit cell 50 of the second modified example shown in FIG. 10A is almost the same as that in FIG. 2. Specifically, the interconnect 3621 functions as an inductance element of the unit cell 50 together with the connecting member 362. That is, in the modified example, the opening 363 and the interconnect 3621 are provided, thereby allowing the inductance value of the unit cell 50 to be increased.

Figure 10B:
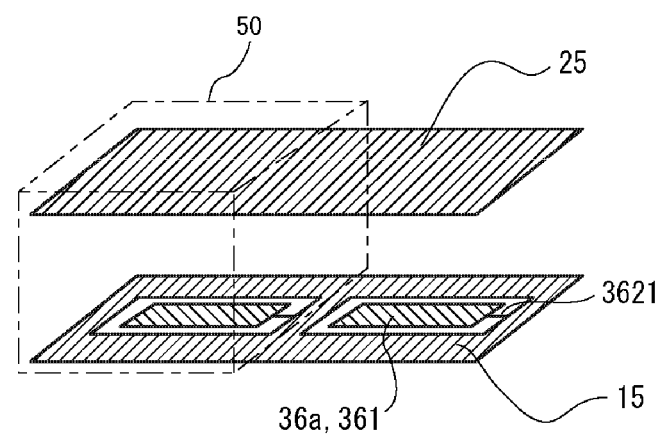
FIG. 10B is a perspective view for explaining a third modified example of the unit cell.

FIG. 10B is a perspective view for explaining a third modified example of the unit cell 50. The unit cell 50 in the modified example is different from that in the second modified example, in that the opposite portion 361 is formed to be separated in an island shape in the inside of the opening 363. That is, the opposite portion 361 of the modified example is provided on the same layer as the first conductor 15, and is connected to the first conductor 15 by the interconnect 3621 narrower than this.

The equivalent circuit of the unit cell 50 of the third modified example is almost the same as that in FIG. 2. Specifically, the interconnect 3621 functions as the inductance element of the unit cell 50 instead of the connecting member 362.

The conductor element 36a (opposite portion 361) of the modified example is formed on the same layer as the first conductor 15. It is also possible to obtain the same effect as that of the second modified example by the modified example. Since the unit cell 50 can be formed of two layers of the first conductor 15 and the second conductor 25, it is possible to reduce the thickness of the wireless communication device 100.

Figure 11A:
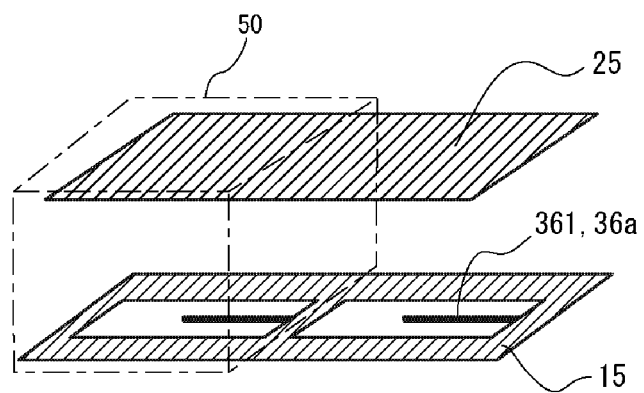
FIG. 11A is a perspective view for explaining a fourth modified example of the unit cell.

FIG. 11A is a perspective view for explaining a fourth modified example of the unit cell 50. The unit cell 50 is different from that of the third modified example shown in FIG. 10B, in that the opposite portion 361 is not a patch but a linear open stub type.

Figure 11B:
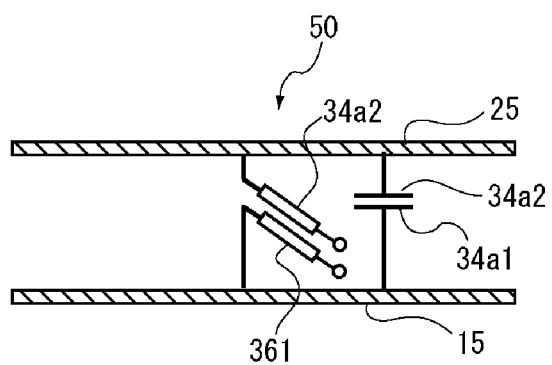
FIG. 11B is an explanatory diagram of an equivalent circuit of the unit cell.

FIG. 11B is an explanatory diagram illustrating an equivalent circuit of the unit cell 50 according to the fourth modified example. The equivalent circuit has an open stub instead of the LC serial resonance circuit in FIGS. 2 and 6, and other configurations are the same as those in FIGS. 2 and 6. Specifically, the linear opposite portion 361 is electrically coupled to the second conductor 25 which is opposite thereto, and thus forms a microstrip line using the second conductor 25 as a return path. One end of the microstrip line is formed as an open end, and is configured to function as an open stub. Such a unit cell 50 can be expressed by the equivalent circuit of FIG. 11B in which a parallel plate formed of the first conductor 15 and the second conductor 25 is shunted by the open stub, and short-circuits the first conductor 15 and the second conductor 25 at the resonance frequency of the open stub. Since the short-circuited frequency can be controlled by the stub length of the open stub, the adjustment thereof is facilitated, and the size of the unit cell 50 can be reduced. The opposite portion 361 can be formed of the bended or curved shape in addition to the linear shape.

In the modified example, the dimension of the linear opposite portion 361 in the length direction (horizontal direction of FIG. 11A) is larger than the dimension in the width direction which is at right angles to this. However, insofar as the microstrip line is formed by the opposite portion 361 and the second conductor 25, the aspect ratio of the opposite portion 361 is not particularly limited.

Figure 12A:
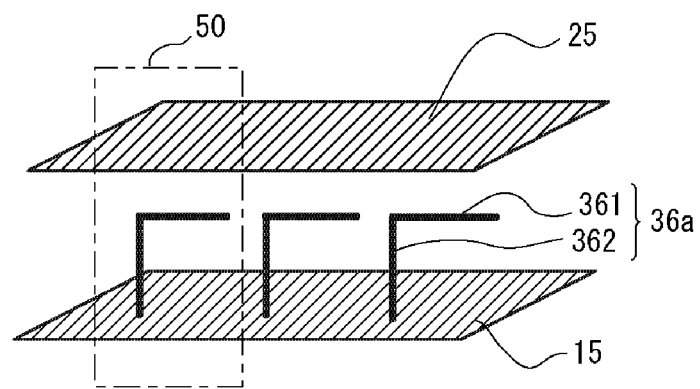
FIG. 12A is a perspective view for explaining a fifth modified example of the unit cell.

FIG. 12A is a perspective view for explaining a fifth modified example of the unit cell 50. The unit cell 50 has the same configuration as the unit cell 50 shown in FIGS. 2 and 6 except that the opposite portion 361 is linear. In the opposite portion 361 of the modified example extends parallel to the first conductor 15. The opposite portion 361 is configured such that one end thereof is connected to the connecting member 362, and the other end thereof is formed of an open end.

Figure 12B:
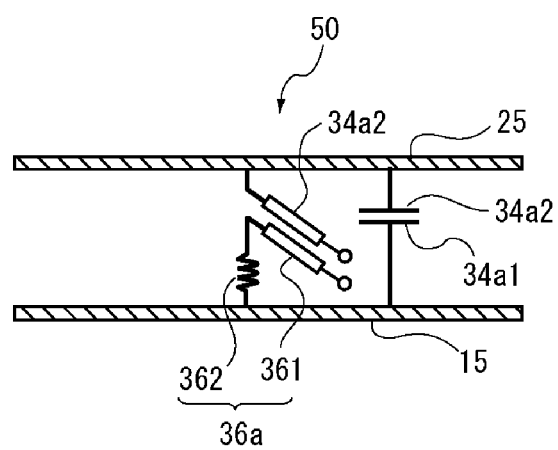
FIG. 12B is an explanatory diagram of an equivalent circuit of the unit cell.

FIG. 12B is an explanatory diagram illustrating an equivalent circuit of the unit cell 50 according to the fifth modified example. The unit cell 50 according to the fifth modified example is the same as the equivalent circuit shown in FIGS. 2 and 6, except that it has an open stub instead of the first capacitance formed by the opposite portion 361 and the second conductor 25. This open stub is formed by linear opposite portion 361 and a portion which are opposite to the opposite portion 361 in the second conductor 25. The open stub is formed, and thus large inductance is given to the unit cell 50. For this reason, the span of adjustable range of the characteristics of the metamaterial becomes larger.

In this manner, in the unit cell 50 of the EBG structure, it is possible to adjust the characteristics of the metamaterial such as the inductance by changing the position or the dimensions of the opposite portion 361 or the connecting member 362 of the conductor element 36a. For this reason, the conductor element 36a capable of obtaining proper characteristics of the metamaterial may be provided depending on the impedance value between the first conductor 15 and the second conductor 25 of the wireless communication device 100 in the open state or the closed state.

In addition, in the wireless communication device 100 according to the second embodiment shown in FIGS. 3A to 3E, a plurality of conductor elements 36a (unit cell 50) may be provided to the first casing 10 or the second casing 20 so that each of the EBG structures is formed in two or more states of the closed state (FIG. 3A), the intersection state (FIG. 3C) and the open state (FIG. 3E). At this time, the characteristics (inductances) of the metamaterial of the EBG structures to be formed may be caused to be different from each other. Thereby, it is possible to suitably reduce the difference between the impedance values of the first conductor 15 and the second conductor 25 in the closed state, the intersection state, and the open state. When the characteristics (inductances) of the metamaterial of the EBG structures to be formed are caused to be different from each other for each unit cell 50, a different kind of unit cell may be selected from the unit cells 50 shown in FIGS. 2, 6, and FIGS. 9A to 12B. Alternatively, the same kind of unit cell 50 may be selected, and then the position or the dimensions of the opposite portion 361 or the connecting member 362 may be changed for each EBG structure.

The application claims priority from Japanese Patent Application Nos. 2010-081484 and 2010-081502 filed on Mar. 31, 2010, the contents of which are incorporated herein by reference in their entireties.

The invention claimed is:

1. A wireless communication device comprising:
 a first casing including a first conductor and a conductor element connected to the first conductor;
 a second casing including a second conductor; and
 a coupling mechanism that couples the first casing and the second casing so as to be rotationally displaceable with respect to each other around a perpendicular axis,
 wherein the first casing and the second casing are rotationally displaced with respect to each other, so that switching is performed at least between:
 a first state in which:
 a predetermined region in the second conductor and the conductor element are located at positions opposite to each other, and
 the first conductor, the conductor element and the second conductor constitute at least a portion of a first metamaterial, and a second state in which
the predetermined region and the conductor element are located at positions not opposite to each other and the first conductor, the conductor element and the second conductor do not constitute a portion of the first metamaterial; and wherein:
the first metamaterial electrically connects the conductor element and the second conductor in the first state at a communication frequency of the wireless communication device;
the second conductor includes a second conductor element in the predetermined region; and
the first conductor or the second conductor includes a third conductor element, and in the second state, the conductor element or the second conductor element, and the third conductor element are opposite to each other to constitute at least a portion of a metamaterial.

2. The wireless communication device according to claim 1, wherein the conductor element and the second conductor element are provided so as to protrude to the inner sides of the first conductor and the second conductor which are opposite to each other in the first state.

3. The wireless communication device according to claim 1, wherein at least one of the conductor element and the second conductor element is provided on the same layer as the first conductor or the second conductor.

4. The wireless communication device according to claim 1, wherein an impedance value between the first conductor and the second conductor for the communication frequency in the first state is different from that in the second state.

5. The wireless communication device according to claim 1, wherein the coupling mechanism includes a plurality of stable states corresponding to the first state and the second state, respectively.

6. The wireless communication device according to claim 5, wherein a closed state where long-side directions of the first casing and the second casing are directed to the same direction centered on the coupling mechanism, an open state where the long-side directions are directed to a reverse direction, and an intersection state where the long-side directions are substantially at right angles to each other are included as the stable states.

7. The wireless communication device according to claim 6, wherein the wireless communication device in the open state takes the first state.

8. The wireless communication device according to claim 1, wherein the predetermined frequency is a communication frequency of an antenna element included in the wireless communication device.

9. The wireless communication device according to claim 1, further comprising a detection unit that detects the an electrical conduction state between the conductor element and the second conductor.

10. The wireless communication device according to claim 9, further comprising a display output portion that displays output information and a display control unit that switches a direction of the output information displayed on the display output portion in multiple ways,
wherein the display control unit switches the direction of the output information between the first state and the second state, on the basis of a detection result of the detection unit.

11. The wireless communication device according to claim 9, wherein the predetermined region which is opposite to the conductor element in the first state in the second conductor is located at a position not opposite to the conductor element in the second state.

12. The wireless communication device according to claim 9, the detection unit includes an application unit that applies a current of the frequency between the conductor element and the second conductor and a current detection unit that detects the current between the conductor element and the second conductor.

13. The wireless communication device according to claim 9, wherein the coupling mechanism includes a plurality of stable states corresponding to the first state and the second state, respectively.

14. The wireless communication device according to claim 13, wherein an closed state where long-side directions of the first casing and the second casing are directed to the same direction centered on the coupling mechanism and an open state where the long-side directions are directed to a reverse direction are included as any of the first state and the second state.

15. The wireless communication device according to claim 13, further comprising a second conductor element connected to one of the first conductor and the second conductor, wherein: the coupling mechanism further includes another stable state corresponding to a third state in which:
(a) a second predetermined region in the other of the first conductor and the second conductor, and (b) the second conductor element are located at positions opposite to each other, and
the second conductor element, the first conductor and the second conductor constitute at least a portion of a second metamaterial.

16. The wireless communication device according to claim 15, wherein the third state is an intersection state where the long-side directions of the first casing and the second casing are substantially at right angles to each other centered on the coupling mechanism.

17. The wireless communication device according to claim 15, wherein, in the second state:
the second conductor element and the other of the first conductor and the second conductor are opposite to each other in a third predetermined region in the other of the first conductor and the second conductor, and
the second conductor element, the first conductor and the second conductor constitute at least a portion of the second metamaterial.

18. The wireless communication device according to claim 17, wherein in the first state, the conductor element, the first conductor and the second conductor constitute at least a portion of the first metamaterial,
in at least one of the second state and the third state, the second conductor element, the first conductor and the second conductor constitute at least a portion of the second metamaterial, and
in the first state and in at least one of the second state and the third state, the first and second metamaterial electrically connects the first conductor to the second conductor at a predetermined frequency.

19. The wireless communication device according to claim 18, wherein the frequency applied to the first metamaterial constituted by the conductor element in the first state and the frequency applied to the second metamaterial constituted by the second conductor in the second state or the third state are communication frequencies of an antenna element included in the wireless communication device.

20. The wireless communication device according to claim 18, further comprising a third conductor element connected to the first conductor or the second conductor, wherein in the first state, the second state and the third state, a different one or more of the conductor element, the second conductor element and the third conductor element constitute a metamaterial.

21. The wireless communication device according to claim 20, wherein the conductor element, the second conductor element and the third conductor element are disposed in different three regions in at least one of the first conductor and the second conductor.

22. The wireless communication device according to claim 20, wherein the conductor element, the second conductor element and the third conductor element are provided so as to protrude to the inner sides, respectively, which are opposite to each other in the first conductor or the second conductor.

23. The wireless communication device according to claim 9, wherein a conductive opposite element is provided in a predetermined region which is opposite to the conductor element in the first state in the second conductor.

24. The wireless communication device according to claim 23, wherein the conductor element and the opposite element are provided so as to protrude to the inner sides, respectively, which are opposite to each other in the first conductor and the second conductor.

25. The wireless communication device, according to claim 23, wherein at least one of the conductor element and the opposite element is provided on the same layer as the first conductor or the second conductor.

26. An impedance adjustment method of reducing impedance of a wireless communication device which includes a first casing including a first conductor and a conductor element connected to the first conductor, a second casing including a second conductor, and a coupling mechanism that couples the first casing and the second casing so as to be rotationally displaceable with respect to each other around a perpendicular axis, comprising:
rotationally displacing the first casing and the second casing to transition between an open state and a closed state, and
causing at least a portion of a first metamaterial, including the first conductor, the conductor element, and the second conductor constitute at, to resonate at a communication frequency of the wireless communication device when, in the open state or the closed state, the conductor element is opposite to the second conductor at a predetermined interval whereby the impedance of the wireless communication device at the communication frequency is reduced;
wherein:
the first metamaterial electrically connects the conductor element and the second conductor in a first state at a communication frequency of the wireless communication device, wherein in the first state a predetermined region in the second conductor and the conductor element are located at positions opposite to each other;
the second conductor includes a second conductor element in the predetermined region; and
the first conductor or the second conductor includes a third conductor element, and in a second state, the conductor element or the second conductor element, and the third conductor element are opposite to each other to constitute at least a portion of a metamaterial.

27. A casing position detection method of detecting a relative position between a first casing and a second casing in a wireless communication device which includes the first casing including a first conductor and a conductor element connected to the first conductor, the second casing including a second conductor, and a coupling mechanism that couples the first casing and the second casing so as to be rotationally displaceable with respect to each other around a perpendicular axis, comprising:
wherein an electrical conduction state between the conductor element and the second conductor is detected in a first state where the conductor element and the second conductor are opposite to each other at a predetermined interval so that the first conductor, the conductor element, and the second conductor constitute at least a portion of a first metamaterial and the conductor element and the second conductor allow electrical conduction to each other at a predetermined frequency, and in a second state where the conductor element and the second conductor are not opposite to each other so that the first conductor, the conductor element, and the second conductor do not constitute the first metamaterial and the electrical conduction state is different from the first state, to thereby detect whether the relative position between the first casing and the second casing is in the first state or in the second state; and
wherein:
the first metamaterial electrically connects the conductor element and the second conductor in the first state at a communication frequency of the wireless communication device wherein in the first state a predetermined region in the second conductor and the conductor element are located at positions opposite to each other;
the second conductor includes a second conductor element in the predetermined region; and
the first conductor or the second conductor includes a third conductor element, and in the second state, the conductor element or the second conductor element, and the third conductor element are opposite to each other to constitute at least a portion of a metamaterial.

28. An information display method of displaying output information on a display output portion provided at any of a first casing and a second casing in the wireless communication device which includes the first casing including a first conductor and a conductor element connected to the first conductor, the second casing including a second conductor, and a coupling mechanism that couples the first casing and the second casing so as to be rotationally displaceable with respect to each other around a perpendicular axis, comprising:
a step of detecting an electrical conduction state between the conductor element and the second conductor in a first state where the conductor element and the second conductor are opposite to each other at a predetermined interval so that the first conductor, the conductor element, and the second conductor constitute at least a portion of a first metamaterial and the conductor element and the second conductor allow electrical conduction to each other at a predetermined frequency, and in a second state where the conductor element and the second conductor are not opposite to each other so that the first conductor, the conductor element, and the second conductor do not constitute the first metamaterial and the electrical conduction state is different from the first state, to thereby detect whether a relative position between the first casing and the second casing is in the first state or in the second state; and a step of switching a direction of the output information displayed on the display output portion between the first state and the second state, on the basis of a detected result;
wherein:
the first metamaterial electrically connects the conductor element and the second conductor in the first state at a communication frequency of the wireless communication device wherein in the first state a predetermined region in the second conductor and the conductor element are located at positions opposite to each other;
the second conductor includes a second conductor element in the predetermined region; and
the first conductor or the second conductor includes a third conductor element, and in the second state, the conductor element or the second conductor element, and the third conductor element are opposite to each other to constitute at least a portion of a metamaterial.

* * * * *